US011811087B2

(12) United States Patent
Koga et al.

(10) Patent No.: US 11,811,087 B2
(45) Date of Patent: Nov. 7, 2023

(54) COMPOSITION FOR NON-AQUEOUS SECONDARY BATTERY ADHESIVE LAYER, BATTERY MEMBER FOR NON-AQUEOUS SECONDARY BATTERY AND METHOD OF PRODUCING SAME, METHOD OF PRODUCING LAMINATE FOR NON-AQUEOUS SECONDARY BATTERY, AND METHOD OF PRODUCING NON-AQUEOUS SECONDARY BATTERY

(71) Applicant: ZEON CORPORATION, Tokyo (JP)

(72) Inventors: Hiroshi Koga, Tokyo (JP); Masanobu Sato, Tokyo (JP); Koji Annaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 140 days.

(21) Appl. No.: 17/266,107

(22) PCT Filed: Aug. 22, 2019

(86) PCT No.: PCT/JP2019/032901
§ 371 (c)(1),
(2) Date: Feb. 5, 2021

(87) PCT Pub. No.: WO2020/045246
PCT Pub. Date: Mar. 5, 2020

(65) Prior Publication Data
US 2021/0296732 A1 Sep. 23, 2021

(30) Foreign Application Priority Data
Aug. 29, 2018 (JP) .................................. 2018-160806

(51) Int. Cl.
*H01M 50/443* (2021.01)
*H01M 50/414* (2021.01)
*H01M 50/403* (2021.01)
*H01M 50/46* (2021.01)
*H01M 4/13* (2010.01)
*H01M 4/139* (2010.01)
*H01M 50/449* (2021.01)
*C09J 151/00* (2006.01)
*H01M 4/04* (2006.01)

(52) U.S. Cl.
CPC ....... *H01M 50/443* (2021.01); *C09J 151/003* (2013.01); *H01M 4/0419* (2013.01); *H01M 4/0471* (2013.01); *H01M 4/13* (2013.01); *H01M 4/139* (2013.01); *H01M 50/403* (2021.01); *H01M 50/414* (2021.01); *H01M 50/461* (2021.01); *H01M 50/449* (2021.01)

(58) Field of Classification Search
CPC ............ H01M 50/443; H01M 50/414; H01M 50/403; H01M 50/461; H01M 50/449; H01M 4/0419; H01M 4/0471; H01M 4/13; H01M 4/139; C09J 151/003
See application file for complete search history.

(56) References Cited

U.S. PATENT DOCUMENTS

| 10,615,379 | B2 | 4/2020 | Asai |
| 2013/0330622 | A1 | 12/2013 | Sasaki |
| 2015/0132499 | A1 | 5/2015 | Kimura |
| 2016/0141581 | A1 | 5/2016 | Sasaki et al. |
| 2018/0342711 | A1 | 11/2018 | Asai |
| 2020/0119333 | A1* | 4/2020 | Masuzawa .......... H01M 4/0404 |

FOREIGN PATENT DOCUMENTS

| CN | 108292735 A | 7/2018 | |
| EP | 3796419 A1 | 3/2021 | |
| JP | 2001181590 A | 7/2001 | |
| JP | 2006096809 A | 4/2006 | |
| JP | 2013145763 A | 7/2013 | |
| JP | 2013203894 A | 10/2013 | |
| JP | 2015088253 A | 5/2015 | |
| JP | 2015141773 A | 8/2015 | |
| JP | 2016081888 A | 5/2016 | |
| JP | 2017084589 A | 5/2017 | |
| WO | WO-2004114440 A2 * | 12/2004 | ........ H01M 10/0436 |
| WO | 2012115096 A1 | 8/2012 | |
| WO | 2013172415 A1 | 11/2013 | |
| WO | 2015005145 A1 | 1/2015 | |
| WO | 2016103559 A1 | 6/2016 | |
| WO | 2017090242 A1 | 6/2017 | |

(Continued)

OTHER PUBLICATIONS

EPO machine generated English translation of WO 2018-004277A1 (Year: 2018).*
Mar. 2, 2021, International Preliminary Report on Patentability issued in the International Patent Application No. PCT/JP2019/032901.
Apr. 28, 2022, the Extended European Search Report issued by the European Patent Office in the corresponding European Patent Application No. 19855307.5.

(Continued)

*Primary Examiner* — Christopher P Domone
*Assistant Examiner* — Kimberly Wyluda
(74) *Attorney, Agent, or Firm* — KENJA IP LAW PC

(57) ABSTRACT

Provided is a composition for a non-aqueous secondary battery adhesive layer containing organic particles, a thixotropic agent, and water. The organic particles have a core-shell structure including a core portion and a shell portion at least partially covering an outer surface of the core portion. The composition for a non-aqueous secondary battery adhesive layer has a viscosity $\eta_0$ at a shear rate of $100\ \text{s}^{-1}$ of less than 10 mPa·s, a viscosity $\eta_1$ at a shear rate of $10,000\ \text{s}^{-1}$ of not less than 0.5 mPa·s and not more than 2.4 mPa·s, and a ratio ($\eta_0/\eta_1$) of the viscosity $\eta_0$ relative to the viscosity $\eta_1$ of not less than 1.2 and not more than 10.

8 Claims, No Drawings

(56) References Cited

FOREIGN PATENT DOCUMENTS

WO 2018004277 A1 1/2018
WO 2018070448 A1 4/2018

OTHER PUBLICATIONS

Nov. 12, 2019, International Search Report issued in the International Patent Application No. PCT/JP2019/032901.

* cited by examiner

COMPOSITION FOR NON-AQUEOUS SECONDARY BATTERY ADHESIVE LAYER, BATTERY MEMBER FOR NON-AQUEOUS SECONDARY BATTERY AND METHOD OF PRODUCING SAME, METHOD OF PRODUCING LAMINATE FOR NON-AQUEOUS SECONDARY BATTERY, AND METHOD OF PRODUCING NON-AQUEOUS SECONDARY BATTERY

TECHNICAL FIELD

The present disclosure relates to a composition for a non-aqueous secondary battery adhesive layer, a battery member for a non-aqueous secondary battery and method of producing the same, a method of producing a laminate for a non-aqueous secondary battery, and a method of producing a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery generally includes battery members such as a positive electrode, a negative electrode, and a separator that isolates the positive electrode and the negative electrode from each other and prevents short circuiting between the positive and negative electrodes.

A technique of affixing battery members of a secondary battery such as an electrode and a separator, for example, to obtain a laminate for a secondary battery is conventionally adopted in production of a secondary battery such as described above. Battery members are adhered to each other by, for example, producing a battery member that includes an adhesive layer at a surface thereof, and then affixing this battery member and another battery member. A battery member that includes an adhesive layer at a surface thereof can be produced by applying, onto the battery member surface, a composition for a secondary battery adhesive layer in which a polymer (binder) that displays adhesiveness, for example, is dispersed and/or dissolved in a solvent, and subsequently drying the composition for a secondary battery adhesive layer.

Moreover, in recent years, battery members including porous membrane layers that impart desired performance such as heat resistance to the battery members have been used in secondary batteries. Specifically, a porous membrane layer-equipped separator having a porous membrane layer formed on a separator substrate and a porous membrane layer-equipped electrode having a porous membrane layer formed on an electrode substrate that includes an electrode mixed material layer on a current collector, for example, have been used as battery members.

Patent Literature (PTL) 1 proposes a composition that contains organic particles and a prescribed water-soluble polymer and that has a specific viscosity for use as a composition for a secondary battery adhesive layer such as mentioned above. Moreover, PTL 2 proposes a composition that contains organic particles having a prescribed structure and a binder and that has a specific viscosity.

CITATION LIST

Patent Literature

PTL 1: WO2017/090242A1
PTL 2: WO2016/103559A1

SUMMARY

Technical Problem

The inventors focused on an inkjet method in which a composition for a secondary battery adhesive layer that is to be used to form an adhesive layer is supplied to a battery member surface by being ejected from nozzles as fine droplets with the aim of strongly adhering battery members to each other while also causing a secondary battery to display excellent battery characteristics. The inventors attempted to produce a porous membrane layer-equipped separator (porous membrane layer-equipped substrate) having an adhesive layer formed on a porous membrane layer by applying a conventional composition for a secondary battery adhesive layer such as described above onto a porous membrane layer of a porous membrane layer-equipped separator by an inkjet method, and then attempted to produce a secondary battery by adhering the porous membrane layer-equipped separator and an electrode (adhesion target member) via the adhesive layer.

However, it became clear that an adhesive layer formed on a porous membrane layer by an inkjet method using a conventional composition for a secondary battery adhesive layer such as described above has low adhesive strength, and that battery resistance increases, and low-temperature output characteristics are lost in a secondary battery obtained therewith.

Consequently, there has been demand for a composition for a non-aqueous secondary battery adhesive layer (hereinafter, also referred to simply as a "composition for a secondary battery adhesive layer") that enables strong adhesion of a porous membrane layer-equipped substrate and an adhesion target member using an inkjet method.

Accordingly, one object of the present disclosure is to provide a composition for a secondary battery adhesive layer that, even in a situation in which an inkjet method is used, can efficiently form an adhesive layer on a porous membrane layer of a porous membrane layer-equipped substrate and enables strong adhesion of the porous membrane layer-equipped substrate and an adhesion target member via the adhesive layer.

Another object of the present disclosure is to provide a battery member for a non-aqueous secondary battery that can strongly adhere to an adhesion target member via an adhesive layer formed on a porous membrane layer of a porous membrane layer-equipped substrate, and also to provide a method of producing this battery member for a non-aqueous secondary battery.

Yet another object of the present disclosure is to provide a method of producing a laminate for a non-aqueous secondary battery in which a porous membrane layer-equipped substrate and an adhesion target member are strongly adhered via an adhesive layer formed on the porous membrane layer of the porous membrane layer-equipped substrate by an inkjet method and that can cause a secondary battery to display excellent low-temperature output characteristics, and also to provide a non-aqueous secondary battery in which a laminate for a non-aqueous secondary battery obtained by this production method is used.

Solution to Problem

The inventors conducted diligent investigation with the aim of solving the problems set forth above. The inventors discovered that by using a composition for a secondary battery adhesive layer that contains organic particles having a core-shell structure, a thixotropic agent, and water, that has a viscosity $\eta_0$ at a shear rate of $100\ s^{-1}$ and a viscosity $\eta_1$ at a shear rate of $10,000\ s^{-1}$ that are within specific ranges, and for which the ratio of the viscosity $\eta_0$ relative to the viscosity $\eta_1$ is within a specific range, an adhesive layer can be efficiently formed on a porous membrane layer of a porous membrane layer-equipped substrate even in a situation in which an inkjet method is used, the porous membrane layer-equipped substrate and an adhesion target member can be strongly adhered via the adhesive layer, and a secondary battery can be caused to display excellent low-temperature output characteristics. In this manner, the inventors completed the present disclosure.

Specifically, the present disclosure aims to advantageously solve the problems set forth above, and a presently disclosed composition for a non-aqueous secondary battery adhesive layer comprises organic particles, a thixotropic agent, and water, wherein the organic particles have a core-shell structure including a core portion and a shell portion at least partially covering an outer surface of the core portion, and the composition for a non-aqueous secondary battery adhesive layer has a viscosity $\eta_0$ at a shear rate of $100\ s^{-1}$ of less than 10 mPa·s, a viscosity $\eta_1$ at a shear rate of $10,000\ s^{-1}$ of not less than 0.5 mPa·s and not more than 2.4 mPa·s, and a ratio $\eta_0/\eta_1$ of the viscosity $\eta_0$ relative to the viscosity $\eta_1$ of not less than 1.2 and not more than 10. When a composition for a secondary battery adhesive layer contains organic particles having a core-shell structure, a thixotropic agent, and water and has a viscosity $\eta_0$ at a shear rate of $100\ s^{-1}$, a viscosity $\eta_1$ at a shear rate of $10,000\ s^{-1}$, and a ratio of the viscosity $\eta_0$ relative to the viscosity $\eta_1$ that are within specific ranges in this manner, an adhesive layer can be efficiently formed on a porous membrane layer of a porous membrane layer-equipped substrate even in a situation in which an inkjet method is used, the porous membrane layer-equipped substrate and an adhesion target member can be strongly adhered via the adhesive layer, and a secondary battery can be caused to display excellent low-temperature output characteristics.

The presently disclosed composition for a non-aqueous secondary battery adhesive layer preferably has a surface tension of not less than 30 mN/m and not more than 60 mN/m. When the surface tension of the composition for a secondary battery adhesive layer is not less than the lower limit set forth above, a porous membrane layer-equipped substrate and an adhesion target member can be more strongly adhered via an adhesive layer formed on the porous membrane layer, increased battery resistance of a secondary battery can be inhibited, and low-temperature output characteristics of a secondary battery can be improved. Moreover, when the surface tension of the composition for a secondary battery adhesive layer is not more than the upper limit set forth above, droplets of the composition for a secondary battery adhesive layer ejected from an inkjet nozzle during application of the composition for a secondary battery adhesive layer by an inkjet method are stabilized. Consequently, non-uniformity of ejection can be suppressed, and good ejection performance can be maintained.

The presently disclosed composition for a non-aqueous secondary battery adhesive layer preferably has a solid content concentration of 30 mass % or less. When the solid content concentration of the composition for a secondary battery adhesive layer is 30 mass % or less, it is possible to improve ejection performance of the composition for a secondary battery adhesive layer during application of the composition for a secondary battery adhesive layer by an inkjet method.

In the presently disclosed composition for a non-aqueous secondary battery adhesive layer, it is preferable that the core portion is formed of a polymer having a degree of swelling in electrolyte solution of not less than a factor of 5 and not more than a factor of 30, the shell portion is formed of a polymer having a degree of swelling in electrolyte solution of more than a factor of 1 and not more than a factor of 4, the polymer forming the core portion has a glass-transition temperature of not lower than −50° C. and not higher than 150° C., and the polymer forming the shell portion has a glass-transition temperature of at least 10° C. lower than the glass-transition temperature of the polymer forming the core portion. When the polymer forming the core portion and the polymer forming the shell portion each have a specific degree of swelling in electrolyte solution and glass-transition temperature, a secondary battery can be caused to display even better low-temperature output characteristics, and reduction of adhesive strength of an adhesive layer in electrolyte solution and deterioration of high-temperature cycle characteristics can be inhibited.

Moreover, the present disclosure aims to advantageously solve the problems set forth above, and a presently disclosed battery member for a non-aqueous secondary battery comprises: a porous membrane layer-equipped substrate having a porous membrane layer formed on at least one surface of a substrate; and an adhesive layer formed in plurality in a dotted form on the porous membrane layer, wherein the substrate is a separator substrate or an electrode substrate, and the adhesive layer is a dried product of any one of the compositions for a non-aqueous secondary battery adhesive layer set forth above. As a result of the presently disclosed battery member for a non-aqueous secondary battery including a porous membrane layer-equipped substrate that includes, on the porous membrane layer, an adhesive layer formed in plurality in a dotted form through drying of any one of the compositions for a secondary battery adhesive layer set forth above, the battery member for a non-aqueous secondary battery can strongly adhere to an adhesion target member via the adhesive layer and can cause a secondary battery to display excellent low-temperature output characteristics.

Furthermore, the present disclosure aims to advantageously solve the problems set forth above, and a presently disclosed method of producing a battery member for a non-aqueous secondary battery comprises: an application step of, with respect to a porous membrane layer-equipped substrate having a porous membrane layer formed on at least one surface of a substrate, applying any one of the compositions for a non-aqueous secondary battery adhesive layer set forth above onto the porous membrane layer of the porous membrane layer-equipped substrate by an inkjet method; and a drying step of drying the composition for a non-aqueous secondary battery adhesive layer that has been applied onto the porous membrane layer to form an adhesive layer, wherein the substrate is a separator substrate or an electrode substrate. Through the presently disclosed method of producing a battery member for a non-aqueous secondary battery, it is possible to efficiently produce a battery member for a secondary battery that can strongly adhere to an adhesion target member via an adhesive layer formed on a porous membrane layer of a porous membrane layer-equipped substrate and that can cause a secondary battery to display excellent low-temperature output characteristics.

Also, the present disclosure aims to advantageously solve the problems set forth above, and a presently disclosed method of producing a laminate for a non-aqueous secondary battery comprises: an application step of, with respect to a porous membrane layer-equipped substrate having a porous membrane layer formed on at least one surface of a substrate, applying any one of the compositions for a non-aqueous secondary battery adhesive layer set forth above onto the porous membrane layer of the porous membrane layer-equipped substrate by an inkjet method; a drying step of drying the composition for a non-aqueous secondary battery adhesive layer that has been applied onto the porous membrane layer to form an adhesive layer; and an adhering step of adhering the porous membrane layer-equipped substrate and an adhesion target member via the adhesive layer, wherein the substrate is a separator substrate or an electrode substrate. By using the composition for a secondary battery adhesive layer set forth above to form an adhesive layer on a porous membrane layer of a porous membrane layer-equipped substrate and then adhering the porous membrane layer-equipped substrate and an adhesion target member via the adhesive layer that is formed in this manner, it is possible to produce a laminate for a non-aqueous secondary battery in which the porous membrane layer-equipped substrate and the adhesion target member are strongly adhered.

Moreover, the present disclosure aims to advantageously solve the problems set forth above, and a presently disclosed method of producing a non-aqueous secondary battery uses a laminate for a non-aqueous secondary battery obtained by the method of producing a laminate for a non-aqueous secondary battery set forth above. By using a laminate for a non-aqueous secondary battery obtained by the presently disclosed method of producing a laminate for non-aqueous secondary battery set forth above in this manner, it is possible to efficiently produce a secondary battery having excellent low-temperature output characteristics.

Advantageous Effect

According to the present disclosure, it is possible to provide a composition for a secondary battery adhesive layer that, even in a situation in which an inkjet method is used, can efficiently form an adhesive layer on a porous membrane layer of a porous membrane layer-equipped substrate and enables strong adhesion of the porous membrane layer-equipped substrate and an adhesion target member via the adhesive layer.

Moreover, according to the present disclosure, it is possible to provide a battery member for a non-aqueous secondary battery that can strongly adhere to an adhesion target member via an adhesive layer formed on a porous membrane layer of a porous membrane layer-equipped substrate, and also to provide a method of producing this battery member for a non-aqueous secondary battery.

Furthermore, according to the present disclosure, it is possible to provide a method of producing a laminate for a non-aqueous secondary battery in which a porous membrane layer-equipped substrate and an adhesion target member are strongly adhered via an adhesive layer formed on the porous membrane layer of the porous membrane layer-equipped substrate and that can cause a secondary battery to display excellent low-temperature output characteristics.

Also, according to the present disclosure, it is possible to provide a method of producing a non-aqueous secondary battery having excellent low-temperature output characteristics.

DETAILED DESCRIPTION

The following provides a detailed description of embodiments of the present disclosure.

The presently disclosed composition for a non-aqueous secondary battery adhesive layer can be used as an adhesive material when forming an adhesive layer on a porous membrane layer of a porous membrane layer-equipped substrate using an inkjet method and then adhering the porous membrane layer-equipped substrate and an adhesion target member via the adhesive layer. More specifically, the presently disclosed composition for a secondary battery adhesive layer can be used to produce a battery member for a non-aqueous secondary battery, a laminate for a non-aqueous secondary battery, and a secondary battery.

(Composition for Non-Aqueous Secondary Battery Adhesive Layer)

The presently disclosed composition for a secondary battery adhesive layer is a slurry composition that contains organic particles, a thixotropic agent, and water and that can optionally contain other components. Requirements of the composition for a secondary battery adhesive layer are that the organic particles have a core-shell structure and that the viscosity $\eta_0$ of the composition at a shear rate of 100 s$^{-1}$, the viscosity $\eta_1$ of the composition at a shear rate of 10,000 s$^{-1}$, and the ratio of the viscosity $\eta_0$ relative to the viscosity $\eta_1$ are within specific ranges.

<Organic Particles>

The organic particles contained in the composition for a secondary battery adhesive layer are a component that functions as a binder in an adhesive layer for adhering battery members, such as a separator and an electrode, to each other. By using the organic particles having a core-shell structure as a binder, battery members can be strongly adhered to each other via an adhesive layer.

<Core-Shell Structure»

The organic particles have a core-shell structure including a core portion and a shell portion that covers an outer surface of the core portion. The shell portion may completely cover the outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, an organic particle including a shell portion that includes pores passing from an outer surface of the shell portion (i.e., a circumferential surface of the organic particle) to an outer surface of a core portion is considered to be an organic particle in which a shell portion partially covers an outer surface of a core portion.

«Core Portion»

[Degree of Swelling in Electrolyte Solution]

The degree of swelling in electrolyte solution of a polymer forming the core portion is preferably a factor of 5 or more, more preferably a factor of 7 or more, and even more preferably a factor of 9 or more, and is preferably a factor of 30 or less, more preferably a factor of 25 or less, even more preferably a factor of 20 or less, and particularly preferably a factor of 10 or less. When the degree of swelling in electrolyte solution of the polymer forming the core portion is within any of the ranges set forth above, reduction of adhesive strength of an adhesive layer in electrolyte solution can be inhibited even in a situation in which the adhesive layer is formed by an inkjet method using the presently disclosed composition for a secondary battery adhesive layer, and deterioration of high-temperature cycle characteristics of a secondary battery can be inhibited. Moreover, when the degree of swelling in electrolyte solution of the polymer forming the core portion is not less than any of the lower limits set forth above, low-temperature output characteristics of a secondary battery can be further improved.

The "degree of swelling in electrolyte solution" referred to in the present disclosure can be measured using a measurement method described in the EXAMPLES section of the present specification.

Moreover, the degree of swelling in electrolyte solution of the polymer forming the core portion can be adjusted by, for example, altering the types and proportions of monomers used to produce the polymer forming the core portion.

[Glass-Transition Temperature (Tg)]

The glass-transition temperature (Tg) of the polymer forming the core portion is preferably −50° C. or higher, more preferably −20° C. or higher, even more preferably 10° C. or higher, and particularly preferably 50° C. or higher, and is preferably 150° C. or lower, more preferably 140° C. or lower, even more preferably 130° C. or lower, and particularly preferably 100° C. or lower. When the glass-transition temperature of the polymer forming the core portion is not lower than any of the lower limits set forth above, battery members can be even more strongly adhered to each other via an adhesive layer even in a situation in which the adhesive layer is formed by an inkjet method using the presently disclosed composition for a secondary battery adhesive layer, and low-temperature output characteristics can be improved. On the other hand, when the glass-transition temperature of the polymer forming the core portion is not higher than any of the upper limits set forth above, high-temperature cycle characteristics of a secondary battery can be improved, and reduction of adhesive strength of an adhesive layer in electrolyte solution can be prevented.

The "glass-transition temperature" referred to in the present disclosure can be measured by a measurement method described in the EXAMPLES section of the present specification.

Moreover, the glass-transition temperature of the polymer forming the core portion can be adjusted by, for example, altering the types and proportions of monomers used to produce the polymer forming the core portion.

[Chemical Composition]

Examples of monomers that can be used to produce the polymer forming the core portion include vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinylamine monomers such as vinylamine; vinylamide monomers such as N-vinylformamide and N-vinylacetamide; (meth)acrylic acid ester monomers such as methyl acrylate, ethyl acrylate, butyl acrylate (n-butyl acrylate, etc.), 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl)ethyl acrylate; maleimide; and maleimide derivatives such as phenylmaleimide. One of these monomers may be used individually, or two or more of these monomers may be used in combination in a freely selected ratio.

Note that in the present disclosure, "(meth)acryl" is used to indicate "acryl" and/or "methacryl", whereas "(meth)acrylonitrile" is used to indicate "acrylonitrile" and/or "methacrylonitrile".

Of these monomers, the use of either or both of an aromatic vinyl monomer and a (meth)acrylic acid ester monomer as monomers used to produce the polymer forming the core portion is preferable, and the use of both an aromatic vinyl monomer and a (meth)acrylic acid ester monomer as monomers used to produce the polymer forming the core portion is more preferable from a viewpoint of more strongly adhering a porous membrane layer-equipped substrate and an adhesion target member via an adhesive layer formed on the porous membrane layer of the porous membrane layer-equipped substrate. In other words, the polymer of the core portion preferably includes either or both of an aromatic vinyl monomer unit and a (meth)acrylic acid ester monomer unit, and more preferably includes both an aromatic vinyl monomer unit and a (meth)acrylic acid ester monomer unit.

The phrase "includes a monomer unit" as used in the present disclosure means that "a polymer obtained with the monomer includes a repeating unit derived from the monomer".

The proportion constituted by an aromatic vinyl monomer unit in the polymer forming the core portion when all repeating units (all monomer units) included in the polymer forming the core portion are taken to be 100 mass % is, from a viewpoint of even more strongly adhering a porous membrane layer-equipped substrate and an adhesion target member via an adhesive layer formed on the porous membrane layer of the porous membrane layer-equipped substrate, preferably 50 mass % or more, more preferably 60 mass % or more, and even more preferably 75 mass % or more, and is preferably 95 mass % or less, and more preferably 90 mass % or less.

Moreover, the proportion constituted by a (meth)acrylic acid ester monomer unit in the polymer forming the core portion when all repeating units (all monomer units) included in the polymer forming the core portion are taken to be 100 mass % is, from a viewpoint of even more strongly adhering a porous membrane layer-equipped substrate and an adhesion target member via an adhesive layer formed on the porous membrane layer of the porous membrane layer-equipped substrate, preferably 2 mass % or more, more preferably 3 mass % or more, and even more preferably 4 mass % or more, and is preferably 50 mass % or less, more preferably 40 mass % or less, and even more preferably 30 mass % or less.

Note that the "proportional content of a monomer unit" referred to in the present disclosure can be measured by a nuclear magnetic resonance (NMR) method such as $^1$H-NMR.

The polymer forming the core portion can also include an acid group-containing monomer unit. Examples of acid group-containing monomers that can form an acid group-containing monomer unit include monomers that include an acid group such as carboxy group-containing monomers, sulfo group-containing monomers, and phosphate group-containing monomers.

Moreover, examples of carboxy group-containing monomers include monocarboxylic acids and dicarboxylic acids.

Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth)acryloyl" is used to indicate "acryloyl" and/or "methacryloyl".

Of these acid group-containing monomers, carboxy group-containing monomers are preferable, of which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the polymer forming the core portion when all repeating units (all monomer units) included in the polymer forming the core portion are taken to be 100 mass % is preferably 0.1 mass % or more, and more preferably 1 mass % or more, and is preferably 15 mass % or less, and more preferably 10 mass % or less. By setting the proportion constituted by an acid group-containing monomer unit within any of the ranges set forth above, dispersibility of the polymer forming the core portion can be increased in production of the organic particles, which facilitates formation of a shell portion partially covering the outer surface of the core portion on the outer surface of the polymer forming the core portion.

The polymer forming the core portion may also include a hydroxy group-containing monomer unit.

Examples of hydroxy group-containing monomers that can form a hydroxy group-containing monomer unit include 2-hydroxyethyl acrylate, 2-hydroxypropyl acrylate, 2-hydroxyethyl methacrylate, and 2-hydroxypropyl methacrylate. One of these hydroxy group-containing monomers may be used individually, or two or more of these hydroxy group-containing monomers may be used in combination in a freely selected ratio.

The proportion constituted by a hydroxy group-containing monomer unit in the polymer forming the core portion when all repeating units (all monomer units) included in the polymer forming the core portion are taken to be 100 mass % is preferably 0.1 mass % or more, and more preferably 1 mass % or more, and is preferably 15 mass % or less, and more preferably 10 mass % or less. By setting the proportion constituted by a hydroxy group-containing monomer unit within any of the ranges set forth above, dispersibility of the polymer forming the core portion can be increased in production of the organic particles, which facilitates formation of a shell portion partially covering the outer surface of the core portion on the outer surface of the polymer forming the core portion.

The polymer forming the core portion preferably includes a cross-linkable monomer unit in addition to the monomer units described above. A cross-linkable monomer that can form a cross-linkable monomer unit is a monomer that can form a cross-linked structure during or after polymerization through heating or irradiation with energy rays. The inclusion of a cross-linkable monomer unit in the polymer forming the core portion makes it easier to set the degree of swelling in electrolyte solution of the organic particles within a preferred range.

The cross-linkable monomer may, for example, be a polyfunctional monomer that includes two or more groups displaying polymerization reactivity in the cross-linkable monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers that include an epoxy group such as allyl glycidyl ether and glycidyl methacrylate; and γ-methacryloxypropyltrimethoxysilane. Of these cross-linkable monomers, di(meth)acrylic acid ester monomers are more preferable from a viewpoint that the degree of swelling in electrolyte solution of the organic particles can easily be controlled. One of these cross-linkable monomers may be used individually, or two or more of these cross-linkable monomers may be used in combination in a freely selected ratio.

The proportion constituted by a cross-linkable monomer unit in the polymer forming the core portion when all repeating units (all monomer units) included in the polymer forming the core portion are taken to be 100 mass % is preferably 0.1 mass % or more, more preferably 0.2 mass % or more, and even more preferably 0.5 mass % or more, and is preferably 10 mass % or less, more preferably 5 mass % or less, and even more preferably 3 mass % or less. By setting the proportion constituted by a cross-linkable monomer unit within any of the ranges set forth above, a porous membrane layer-equipped substrate and an adhesion target member can be more strongly adhered via an adhesive layer formed on the porous membrane layer of the porous membrane layer-equipped substrate while also controlling the degree of swelling in electrolyte solution of the organic particles and further improving low-temperature output characteristics of a secondary battery.

«Shell Portion»

[Degree of Swelling in Electrolyte Solution]

The degree of swelling in electrolyte solution of the shell portion is preferably more than a factor of 1, more preferably a factor of 1.1 or more, and even more preferably a factor of 1.3 or more, and is preferably a factor of 4 or less, more preferably a factor of 3.5 or less, and even more preferably a factor of 3.0 or less. When the degree of swelling in electrolyte solution of the shell portion is within any of the ranges set forth above, reduction of adhesive strength in electrolyte solution of an adhesive layer formed on a porous membrane layer of a porous membrane layer-equipped substrate can be inhibited, and deterioration of high-temperature cycle characteristics of a secondary battery can be inhibited. Moreover, when the degree of swelling in electrolyte solution of a polymer forming the shell portion is more than a factor of 1, low-temperature output characteristics of a secondary battery can be even further improved.

Note that the degree of swelling in electrolyte solution of the polymer forming the shell portion can be adjusted by, for example, altering the types and proportions of monomers used to produce the polymer forming the shell portion.

[Glass-Transition Temperature (Tg)]

The glass-transition temperature (Tg) of the polymer forming the shell portion is preferably at least 10° C. lower than the glass-transition temperature of the polymer forming the core portion described above, more preferably at least 30° C. lower than the glass-transition temperature of the polymer forming the core portion, and even more preferably at least 50° C. lower than the glass-transition temperature of the polymer forming the core portion from a viewpoint of even more strongly adhering a porous membrane layer-equipped substrate and an adhesion target member via an adhesive layer formed on the porous membrane layer of the porous membrane layer-equipped substrate. When the glass-transition temperature of the polymer forming the shell portion is at least 10° C. lower than the glass-transition temperature of the polymer forming the core portion, reduction of adhesive strength of an adhesive layer can be inhibited when the adhesive layer is formed on a porous membrane layer by an inkjet method using the presently disclosed composition for a secondary battery adhesive layer, and a secondary battery can be caused to display even better low-temperature output characteristics.

[Chemical Composition]

Examples of monomers that can be used to produce the polymer forming the shell portion include the same monomers as given as examples of monomers that can be used to produce the polymer forming the core portion, for example. One of such monomers may be used individually, or two or more of such monomers may be used in combination in a freely selected ratio.

Of these monomers, the use of either or both of a (meth)acrylic acid ester monomer and an aromatic vinyl monomer as monomers used for producing the polymer forming the shell portion is preferable, and the use of both a (meth)acrylic acid ester monomer and an aromatic vinyl monomer as monomers used for producing the polymer forming the shell portion is more preferable from a viewpoint of even more strongly adhering a porous membrane layer-equipped substrate and an adhesion target member via an adhesive layer formed on the porous membrane layer of the porous membrane layer-equipped substrate. In other words, the polymer forming the shell portion preferably includes either or both of a (meth)acrylic acid ester monomer unit and an aromatic vinyl monomer unit, and more preferably includes both a (meth)acrylic acid ester monomer unit and an aromatic vinyl monomer unit.

The proportion constituted by a (meth)acrylic acid ester monomer unit in the polymer forming the shell portion when all repeating units (all monomer units) included in the polymer forming the shell portion are taken to be 100 mass % is, from a viewpoint of even more strongly adhering a porous membrane layer-equipped substrate and an adhesion target member via an adhesive layer formed on the porous membrane layer of the porous membrane layer-equipped substrate, preferably 10 mass % or more, more preferably 30 mass % or more, and even more preferably 50 mass % or more, and is preferably 95 mass % or less, more preferably 90 mass % or less, and even more preferably 85 mass % or less.

Moreover, the proportion constituted by an aromatic vinyl monomer unit in the polymer forming the shell portion when all repeating units (all monomer units) included in the polymer forming the shell portion are taken to be 100 mass % is, from a viewpoint of even more strongly adhering a porous membrane layer-equipped substrate and an adhesion target member via an adhesive layer formed on the porous membrane layer of the porous membrane layer-equipped substrate, preferably 5 mass % or more, more preferably 10 mass % or more, and even more preferably 15 mass % or more, and is preferably 40 mass % or less, more preferably 30 mass % or less, and even more preferably 25 mass % or less.

Besides a (meth)acrylic acid ester monomer unit and an aromatic vinyl monomer unit, the polymer forming the shell portion can include an acid group-containing monomer unit. Examples of acid group-containing monomers that can form an acid group-containing monomer unit include monomers that include an acid group such as carboxy group-containing monomers, sulfo group-containing monomers, and phosphate group-containing monomers. Specifically, examples of acid group-containing monomers that can be used include the same monomers as the acid group-containing monomers that can be used to form the core portion.

Of these acid group-containing monomers, carboxy group-containing monomers are preferable, of which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the polymer forming the shell portion when all repeating units (all monomers units) included in the polymer of the shell portion are taken to be 100 mass % is preferably 0.1 mass % or more, more preferably 0.4 mass % or more, and even more preferably 0.7 mass % or more, and is preferably 15 mass % or less, more preferably 10 mass % or less, and even more preferably 5 mass % or less. By setting the proportion constituted by an acid group-containing monomer unit within any of the ranges set forth above, dispersibility of the organic particles can be improved, and battery members can be even more strongly adhered to each other via an adhesive layer.

The polymer forming the shell portion may also include a hydroxy group-containing monomer unit.

Examples of hydroxy group-containing monomers that can form a hydroxy group-containing monomer unit of the polymer forming the shell portion include the same monomers as the hydroxy group-containing monomers that can be used to form the core portion.

The proportion constituted by a hydroxy group-containing monomer unit in the polymer forming the shell portion when all repeating units (all monomers units) included in the polymer forming the shell portion are taken to be 100 mass % is preferably 0.1 mass % or more, more preferably 0.4 mass % or more, and even more preferably 0.7 mass % or more, and is preferably 15 mass % or less, more preferably 10 mass % or less, and even more preferably 5 mass % or less. By setting the proportion constituted by a hydroxy group-containing monomer unit within any of the ranges set forth above, dispersibility of the organic particles can be improved, and a porous membrane layer-equipped substrate and an adhesion target member can be even more strongly adhered via an adhesive layer formed on the porous membrane layer of the porous membrane layer-equipped substrate.

The polymer forming the shell portion can also include a cross-linkable monomer unit. Examples of cross-linkable monomers that can form a cross-linkable monomer unit include the same monomers as given as examples of cross-linkable monomers that can be used for the polymer forming the core portion, for example. Of these cross-linkable monomers, di(meth)acrylic acid ester monomers and divinyl monomers are preferable. For example, allyl methacrylate is preferable. One cross-linkable monomer may be used individually, or two or more cross-linkable monomers may be used in combination in a freely selected ratio.

The proportion constituted by a cross-linkable monomer unit in the polymer forming the shell portion when all repeating units (all monomer units) included in the polymer of the shell portion are taken to be 100 mass % is preferably 0.05 mass % or more, more preferably 0.1 mass % or more, and even more preferably 0.2 mass % or more, and is preferably 4 mass % or less, more preferably 3 mass % or less, and even more preferably 2 mass % or less.

<Volume-Average Particle Diameter (D50) of Organic Particles>

The volume-average particle diameter (D50) of the organic particles is preferably 100 nm or more, more preferably 150 nm or more, and even more preferably 180 nm or more, and is preferably 1,000 nm or less, more preferably 350 nm or less, and even more preferably 300 nm or less. When the volume-average particle diameter of the organic particles is not less than any of the lower limits set forth above, a porous membrane layer-equipped substrate and an adhesion target member can be even more strongly adhered via an adhesive layer formed on the porous membrane layer of the porous membrane layer-equipped substrate. On the other hand, when the volume-average particle diameter of the organic particles is not more than any of the upper limits set forth above, nozzle clogging can be further inhibited during ejection of the presently disclosed composition for a secondary battery adhesive layer by an inkjet method, and an adhesive layer can be more efficiently formed on a porous membrane layer.

The "volume-average particle diameter of the organic particles" referred to in the present disclosure can be measured by a method described in the EXAMPLES section of the present specification.

Moreover, the volume-average particle diameter of the organic particles can be adjusted by, for example, altering the types and amounts of a polymerization initiator and/or an emulsifier used to produce the organic particles.

<Core-Shell Ratio of Organic Particles>

The shell portion of the organic particles preferably has an average thickness that is within a specific range relative to the volume-average particle diameter (D50) of the organic particles. More specifically, the core-shell ratio of the organic particles, which is the average thickness of the shell portion relative to the volume-average particle diameter (D50) of the organic particles, is preferably 1.5% or more, more preferably 3% or more, and even more preferably 5% or more, and is preferably 40% or less, more preferably 30% or less, and even more preferably 20% or less. When the core-shell ratio of the organic particles is not less than any of the lower limits set forth above, it is possible to inhibit reduction of adhesive strength outside of electrolyte solution of an adhesive layer formed on a porous membrane layer of a porous membrane layer-equipped substrate. Moreover, when the core-shell ratio of the organic particles is not more than any of the upper limits set forth above, it is possible to inhibit reduction of adhesive strength in electrolyte solution of an adhesive layer formed on a porous membrane layer of a porous membrane layer-equipped substrate.

The "average thickness of the shell portion" referred to in the present disclosure can be measured by a method described in the EXAMPLES section of the present specification.

<Ratio of Coverage of Organic Particles>

When the average proportion of the outer surface of the core portion that is covered by the shell portion in the organic particles is taken to be the ratio of coverage of the organic particles, the ratio of coverage of the organic particles is preferably 20% or more, more preferably 40% or more, and even more preferably 55% or more, and is preferably 99% or less, more preferably 97% or less, and even more preferably 95% or less. When the ratio of coverage of the organic particles is not less than any of the lower limits set forth above, reduction of adhesive strength of an adhesive layer outside of electrolyte solution can be inhibited. Moreover, when the ratio of coverage of the organic particles is not more than any of the upper limits set forth above, low-temperature output characteristics of a secondary battery can be further improved.

The "ratio of coverage of the organic particles" referred to in the present disclosure can be measured by a method described in the EXAMPLES section of the present specification. Moreover, a covered proportion Rc that is used to determine the ratio of coverage of the organic particles can be calculated manually from the cross-sectional structure of the organic particles or can be calculated using commercially available image analysis software. One example of commercially available image analysis software that can be used is AnalySIS Pro (produced by Olympus Corporation).

«Production Method of Organic Particles»

The organic particles having the core-shell structure described above can be produced, for example, by stepwise polymerization in which the ratio of one or more monomers for the polymer forming the core portion and one or more monomers for the polymer forming the shell portion is changed over time. Specifically, the organic particles can be produced by continuous, multi-step emulsion polymerization or multi-step suspension polymerization in which a polymer formed in a preceding step is then covered by a polymer formed in a succeeding step.

The following describes one example of a case in which the organic particles having the core-shell structure are obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis[2-methyl-N-(2-hydroxyethyl)-propionamide] or 2,2'-azobis(2-amidinopropane) hydrochloride may be used as a polymerization initiator.

The polymerization procedure involves initially mixing one or more monomers for forming the core portion and the emulsifier, and then performing emulsion polymerization as one batch to obtain a particulate polymer that forms the core portion. The organic particles having the core-shell structure described above can then be obtained by performing polymerization of one or more monomers for forming the shell portion in the presence of the particulate polymer forming the core portion.

In a case in which organic particles in which a shell portion at least partially covers an outer surface of a core portion are to be produced, the monomers for forming the polymer that forms the shell portion are preferably supplied into the polymerization system continuously or divided into a plurality of portions. By supplying the monomers for forming the polymer of the shell portion into the polymerization system continuously or in portions, the polymer forming the shell portion is formed as particles that bond to the core portion to thereby enable formation of a shell portion that at least partially covers the core portion.

<Thixotropic Agent>

The thixotropic agent contained in the composition for a secondary battery adhesive layer is a component that imparts viscosity to the composition for a secondary battery adhesive layer. Moreover, since the thixotropic agent displays adhesiveness and electrolyte solution resistance, the thixotropic agent can also fulfill a role in assisting adhesion between components in the composition for a secondary battery adhesive layer and between battery members inside a secondary battery.

The thixotropic agent may, for example, be a natural polymer, a semi-synthetic polymer, or a synthetic polymer.

[Natural Polymers]

Examples of natural polymers that can be used include polysaccharides and proteins derived from plants or animals, fermentation treated products of these polysaccharides and proteins by microorganisms or the like, and heat treated products of these polysaccharides and proteins.

These natural polymers can be classified as plant-based natural polymers, animal-based natural polymers, microorganism-produced natural polymers, and so forth.

Examples of plant-based natural polymers include gum arabic, gum tragacanth, galactan, guar gum, carob gum, karaya gum, carrageenan, pectin, quince seed (marmelo), algal colloid (phaeophyceae extract), starch (for example, starch derived from rice, corn, potato, or wheat), and glycyrrhizin. Examples of animal-based natural polymers include collagen, casein, albumin, and gelatin. Examples of microorganism-produced natural polymers include xanthan gum, dextran, succinoglucan, and pullulan.

[Semi-Synthetic Polymers]

Examples of semi-synthetic polymers that can be used include cellulosic semi-synthetic polymers. Cellulosic semi-synthetic polymers can be categorized as non-ionic cellulosic semi-synthetic polymers, anionic cellulosic semi-synthetic polymers, and cationic cellulosic semi-synthetic polymers.

Examples of non-ionic cellulosic semi-synthetic polymers include alkyl celluloses such as methyl cellulose, methyl ethyl cellulose, ethyl cellulose, and microcrystalline cellulose; and hydroxyalkyl celluloses such as hydroxyethyl cellulose, hydroxybutyl methylcellulose, hydroxypropyl cellulose, hydroxypropyl methylcellulose, hydroxyethyl methylcellulose, hydroxypropyl methylcellulose stearoxy ether, carboxymethyl hydroxyethyl cellulose, alkyl hydroxyethyl cellulose, and nonoxynyl hydroxyethyl cellulose.

Examples of anionic cellulosic semi-synthetic polymers include substitution products obtained by substitution of the non-ionic cellulosic semi-synthetic polymers described above with various derivative groups and salts (sodium salts, ammonium salts, etc.) of these substitution products. Specific examples include sodium cellulose sulfate, methyl cellulose, methyl ethyl cellulose, ethyl cellulose, carboxymethyl cellulose (CMC), cellulose nanofiber (CNF), and salts thereof.

Examples of cationic cellulosic semi-synthetic polymers include low nitrogen hydroxyethyl cellulose dimethyl diallylammonium chloride (polyquaternium-4), 0-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

[Synthetic Polymers]

Examples of synthetic polymers that can be used include salts of polyacrylic acid such as sodium polyacrylate, polyvinyl alcohol, polyethylene oxide, polyvinyl pyrrolidone, copolymers of vinyl alcohol and (meth)acrylic acid or a salt of acrylic acid, copolymers of an acrylic acid ester and (meth)acrylic acid or a salt of acrylic acid, fully or partially saponified copolymers of vinyl acetate and maleic anhydride, maleic acid, or fumaric acid, modified polyvinyl alcohol, modified polyacrylic acid, polyethylene glycol, polycarboxylic acid, ethylene-vinyl alcohol copolymers, vinyl acetate polymers, and acrylamide polymers having an introduced carboxy group.

Of these thixotropic agents, carboxymethyl cellulose and salts thereof, copolymers of an acrylic acid ester and (meth)acrylic acid or a salt of acrylic acid, and cellulose nanofiber (CNF) are preferable, and cellulose nanofiber (CNF) is more preferable.

From a viewpoint of ensuring good battery characteristics of a secondary battery, the content of the thixotropic agent in the composition for a secondary battery adhesive layer per 100 parts by mass of the organic particles is preferably 0.05 parts by mass or more, and is preferably 5 parts by mass or less, more preferably 1 part by mass or less, and even more preferably 0.4 parts by mass or less.

<Water>

The water contained in the composition for a secondary battery adhesive layer functions as a solvent for dissolving or dispersing each of the components contained in the composition for a secondary battery adhesive layer. Although no specific limitations are placed on the amount of water that is contained in the composition for a secondary battery adhesive layer so long as each component in the composition for a secondary battery adhesive layer can be dissolved or dispersed, the amount of water is preferably adjusted so that the solid content concentration of the composition for a secondary battery adhesive layer is preferably 0.5 mass % or more, more preferably 1 mass % or more, and even more preferably 3 mass % or more, and is preferably 30 mass % or less, more preferably 15 mass % or less, and even more preferably 10 mass % or less. When the solid content concentration of the composition for a secondary battery adhesive layer is not less than any of the lower limits set forth above, an adhesive layer can be efficiently formed through application of the composition for a secondary battery adhesive layer using an inkjet method, which enables improvement of the rate of secondary battery production. Moreover, when the solid content concentration of the composition for a secondary battery adhesive layer is not more than any of the upper limits set forth above, ejection performance of the composition for a secondary battery adhesive layer during application using an inkjet method can be further improved.

<Other Components>

No specific limitations are placed on other components besides the above-described organic particles having a core-shell structure, thixotropic agent, and water that can be contained in the composition for a secondary battery adhesive layer. Additives and other binders besides the above-described organic particles having a core-shell structure may be used as other components.

«Additives»

Surface tension modifiers, dispersants, viscosity modifiers, reinforcing materials, additives for electrolyte solution, and so forth can be used as additives without any specific limitations. These additives are not specifically limited so long as they do not affect battery reactions and may be selected from commonly known additives such as those described in WO2012/115096A1, for example. One of these additives may be used individually, or two or more of these additives may be used in combination in a freely selected ratio.

«Other Binders»

No specific limitations are placed on other binders so long as they are not organic particles having a core-shell structure, and examples thereof include a fluoropolymer such as polyvinylidene fluoride (PVdF) or polyvinylidene fluoride-hexafluoropropylene (PVdF-HFP) copolymer; a conjugated diene polymer such as styrene-butadiene copolymer (SBR) or acrylonitrile-butadiene copolymer (NBR); a hydrogenated product of a conjugated diene polymer; and a polymer including a (meth)acrylic acid alkyl ester monomer unit (acrylic polymer). One of these other binders may be used individually, or two or more of these other binders may be used in combination in a freely selected ratio.

The glass-transition temperature of a polymer forming another binder is preferably −60° C. or higher, and more preferably −40° C. or higher, and is preferably 20° C. or lower, more preferably 15° C. or lower, and even more preferably 10° C. or lower. When the glass-transition temperature of a polymer forming another binder is not lower than any of the lower limits set forth above, low-temperature output characteristics of a secondary battery can be further improved. Moreover, when the glass-transition temperature of a polymer forming another binder is not higher than any of the upper limits set forth above, dusting resistance of an adhesive layer can be improved.

The composition for a secondary battery adhesive layer preferably contains 1 part by mass or more, more preferably 5 parts by mass or more, and even more preferably 8 parts by mass or more of another binder per 100 parts by mass of the above-described organic particles having a core-shell structure, and preferably contains 50 parts by mass or less, more preferably 35 parts by mass or less, and even more preferably 25 parts by mass or less of another binder per 100 parts by mass of the organic particles. When the content of another binder is not less than any of the lower limits set forth above, dusting resistance of an adhesive layer can be further improved. Moreover, when the content of another binder is not more than any of the upper limits set forth above, low-temperature output characteristics of a secondary battery can be further improved.

<Production Method of Composition for Non-Aqueous Secondary Battery Adhesive Layer>

The presently disclosed composition for a secondary battery adhesive layer can be produced by, for example, mixing the organic particles having a core-shell structure, the thixotropic agent, water, and other optionally used components such as another binder. The mixing can be performed using a typical stirring vessel, ball mill, sand mill, bead mill, pigment disperser, ultrasonic disperser, grinding machine, homogenizer, planetary mixer, FILMIX, or the like. Although no specific limitations are placed on the mixing conditions, mixing is normally performed at from room temperature to 80° C. for from 10 minutes to several hours.

<Properties of Composition for Non-Aqueous Secondary Battery Adhesive Layer>

The presently disclosed composition for a secondary battery adhesive layer is required to have prescribed properties from a viewpoint of adhesion and resistance.

«Viscosity»

The viscosity $\eta_0$ of the presently disclosed composition for a secondary battery adhesive layer at a shear rate of 100 $s^{-1}$ is required to be less than 10 mPa·s, and is preferably 8 mPa·s or less, and more preferably 7 mPa·s or less. As a result of the viscosity $\eta_0$ of the composition for a secondary battery adhesive layer at a shear rate of 100 $s^{-1}$ being less than 10 mPa·s, nozzle clogging can be inhibited, and excellent ejection performance can be ensured during ejection of the composition for a secondary battery adhesive layer from a nozzle using an inkjet method.

Moreover, the viscosity $\eta_1$ of the presently disclosed composition for a secondary battery adhesive layer at a shear rate of 10,000 $s^{-1}$ is required to be not less than 0.5 mPa·s and not more than 2.4 mPa·s, is preferably 0.6 mPa·s or more, and more preferably 0.7 mPa·s or more, and is preferably 2 mPa·s or less, and more preferably 1.5 mPa·s or less.

As a result of the viscosity $\eta_1$ of the composition for a secondary battery adhesive layer at a shear rate of 10,000 $s^{-1}$ being 0.5 mPa·s or more, a porous membrane layer-equipped substrate and an adhesion target member can be strongly adhered via an adhesive layer when the adhesive layer is formed on the porous membrane layer by an inkjet method using the presently disclosed composition for a secondary battery adhesive layer, and increased resistance of a secondary battery can be inhibited.

Moreover, as a result of the viscosity $\eta_1$ of the composition for a secondary battery adhesive layer at a shear rate of 10,000 $s^{-1}$ being 2.4 mPa·s or less, nozzle clogging can be further inhibited, and even better ejection performance can be ensured during ejection of the composition for a secondary battery adhesive layer from a nozzle using an inkjet method.

The ratio $(\eta_0/\eta_1)$ of the viscosity $\eta_0$ relative to the viscosity $\eta_1$ of the presently disclosed composition for a secondary battery adhesive layer is required to be not less than 1.2 and not more than 10, is preferably 1.6 or more, and more preferably 2 or more, and is preferably 9 or less, and preferably 8 or less.

When the ratio $(\eta_0/\eta_1)$ of the viscosity $\eta_0$ relative to the viscosity $\eta_1$ is not less than any of the lower limits set forth above, a porous membrane layer-equipped substrate and an adhesion target member can be strongly adhered via an adhesive layer when the adhesive layer is formed on the porous membrane layer by an inkjet method using the presently disclosed composition for a secondary battery adhesive layer, and increased battery resistance of a secondary battery can be inhibited.

Moreover, when the ratio $(\eta_0/\eta_1)$ of the viscosity $\eta_0$ relative to the viscosity $\eta_1$ is not more than any of the upper limits set forth above, nozzle clogging can be further inhibited, and even better ejection performance can be ensured during ejection of the composition for a secondary battery adhesive layer from a nozzle using an inkjet method.

The viscosity $\eta_0$ at a shear rate of 100 $s^{-1}$ and the viscosity $\eta_1$ at a shear rate of 10,000 $s^{-1}$ can be measured by a method described in the EXAMPLES section of the present specification.

Moreover, the viscosity $\eta_0$, the viscosity qi, and the ratio $(\eta_0/\eta_1)$ of the viscosity $\eta_0$ relative to the viscosity $\eta_1$ can be adjusted as appropriate by adjusting the content of the organic particles and the content of the thixotropic agent in the composition for a secondary battery adhesive layer, the solid content concentration of the composition for a secondary battery adhesive layer, the chemical composition of the thixotropic agent, and so forth.

«Surface Tension»

The surface tension of the composition for a secondary battery adhesive layer is preferably 30 mN/m or more, more preferably 36 mN/m or more, and even more preferably 42 mN/m or more, and is preferably 60 mN/m or less, more preferably 56 mN/m or less, and even more preferably 53 mN/m or less. When the surface tension of the composition for a secondary battery adhesive layer is not less than any of the lower limits set forth above, a porous membrane layer-equipped substrate and an adhesion target member can be more strongly adhered via an adhesive layer when the adhesive layer is formed on the porous membrane layer of the porous membrane layer-equipped substrate by an inkjet method, and increased battery resistance of a secondary battery can be further inhibited. Moreover, when the surface tension of the composition for a secondary battery adhesive layer is not more than any of the upper limits set forth above, droplets of the composition for a secondary battery adhesive layer ejected from a nozzle when an inkjet method is used are stabilized, and thus non-uniformity of ejection can be suppressed, and ejection performance can be further improved.

(Battery Member for Non-Aqueous Secondary Battery)

The presently disclosed battery member for a non-aqueous secondary battery (hereinafter, also referred to simply as a "battery member for a secondary battery" or a "battery member") is a porous membrane layer-equipped battery member that includes a porous membrane layer-equipped substrate having a porous membrane layer formed on at least one surface of a substrate and an adhesive layer formed in plurality in a dotted form on the porous membrane layer. Moreover, the porous membrane layer-equipped substrate is a separator substrate or an electrode substrate, and the adhesive layer is a dried product of the presently disclosed composition for a secondary battery adhesive layer set forth above. The presently disclosed battery member for a secondary battery can strongly adhere to an adhesion target member via the adhesive layer formed on the porous membrane layer and can cause a secondary battery to display excellent low-temperature output characteristics.

Note that the presently disclosed battery member for a secondary battery can be used as a separator for a secondary battery in a case in which the substrate is a separator substrate and can be used as an electrode for a secondary battery in a case in which the substrate is an electrode substrate.

<Porous Membrane Layer-Equipped Substrate>

The porous membrane layer-equipped substrate included in the presently disclosed battery member for a secondary battery has a porous membrane layer formed on at least one surface of a substrate as previously described. The porous membrane layer is a layer of a porous membrane that is formed on a separator substrate or an electrode substrate and is formed in order to improve heat resistance, strength, and so forth. The porous membrane layer normally contains non-conductive inorganic particles, a binder for a porous membrane layer, and any additives and can be formed on a separator substrate or an electrode substrate by a method described further below, for example.

«Properties of Porous Membrane Layer»

[Surface Roughness Ra]

The porous membrane layer normally has a surface roughness Ra of not less than 0.1 μm and not more than 5.0 μm. The surface roughness Ra of the porous membrane layer is preferably 0.15 μm or more, and more preferably 0.2 μm or more, and is preferably 1.0 μm or less, and more preferably 0.6 μm or less.

When the surface roughness Ra of the porous membrane layer is 0.1 μm or more, the contact area between the porous membrane layer and the adhesive layer formed on the porous membrane layer increases, which can increase adhesiveness between the porous membrane layer and the adhesive layer and can also increase adhesiveness of the porous membrane layer-equipped substrate and an adhesion target member via the adhesive layer formed on the porous membrane layer. Consequently, good adhesion between battery members can be maintained and expansion of a produced secondary battery can be inhibited even upon repeated charging and discharging of the secondary battery.

Moreover, when the surface roughness Ra of the porous membrane layer is 5.0 μm or less, organic particles contained in the adhesive layer formed on the porous membrane layer can be inhibited from entering irregularities in the surface of the porous membrane layer. Consequently, adhesiveness of the organic particles can be sufficiently displayed, and adhesiveness of the porous membrane layer-equipped substrate and an adhesion target member via the adhesive layer can be increased. Moreover, as a result of the organic particles being inhibited from entering the porous membrane layer and filling voids inside the porous membrane layer, increased battery resistance of a produced secondary battery can be inhibited, and the secondary battery can be caused to display good output characteristics.

«Separator Substrate and Electrode Substrate»

The separator substrate can be any known separator substrate that can be used in the field of secondary batteries without any specific limitations.

The electrode substrate is normally an electrode substrate obtained by forming an electrode mixed material layer on a current collector.

The current collector may be made of a metal material such as iron, copper, aluminum, nickel, stainless steel, titanium, tantalum, gold, or platinum. Of these metal materials, the current collector for a negative electrode is preferably made of copper. The current collector for a positive electrode is preferably made of aluminum.

The electrode mixed material layer may be a layer that contains an electrode active material and a binder (binder for an electrode mixed material layer). Specifically, the electrode mixed material layer may be an electrode mixed material layer described in JP2013-145763A, for example, but is not specifically limited thereto.

Moreover, a known method may be adopted as the method by which the electrode mixed material layer is formed on the current collector.

<Adhesive Layer>

The adhesive layer included in the presently disclosed battery member for a secondary battery is a dried product of the presently disclosed composition for a secondary battery adhesive layer set forth above. The adhesive layer is formed in plurality in a dotted form on the porous membrane layer of the porous membrane layer-equipped substrate included in the battery member. The dotted adhesive layer may be formed by ejecting the composition for a secondary battery adhesive layer from a nozzle using an inkjet method, for example.

Note that the dotted adhesive layer may be formed uniformly over the entirety of a surface where the adhesive layer is formed on the porous membrane layer of the porous membrane layer-equipped substrate (hereinafter, referred to as a "formation surface"), or the dotted adhesive layer may be formed in an array such as to have a specific pattern such as a striped pattern, a dotted pattern, or a lattice pattern. In particular, it is preferable that the dotted adhesive layer is formed in a striped array from a viewpoint of increasing electrolyte solution injectability during production of a secondary battery using the presently disclosed battery member.

The cross-sectional shape of the adhesive layer can be a protruding shape, a protruding/depressed shape, or a depressed shape without any specific limitations. Of these cross-sectional shapes, a protruding/depressed shape is preferable from a viewpoint of even more strongly adhering the battery member for a secondary battery to an adhesion target member via the adhesive layer. Note that the cross-sectional shape of the adhesive layer can be altered by, for example, adjusting the drying conditions in formation of the adhesive layer using the presently disclosed composition for a secondary battery adhesive layer.

The formed amount of the adhesive layer is preferably not less than 0.01 $g/m^2$ and not more than 10 $g/m^2$, more preferably not less than 0.03 $g/m^2$ and not more than 5 $g/m^2$, and particularly preferably not less than 0.05 $g/m^2$ and not more than 0.5 $g/m^2$. When the formed amount of the adhesive layer is 0.01 $g/m^2$ or more, the member for a secondary battery and an adhesion target member can be even more strongly adhered via the adhesive layer. On the other hand, when the formed amount of the adhesive layer is 10 $g/m^2$ or less, increased battery resistance of a produced secondary battery can be inhibited, and the secondary battery can be caused to display good output characteristics.

Note that the "formed amount of the adhesive layer" referred to in the present disclosure is the amount of the composition for a secondary battery adhesive layer that is required to form the adhesive layer per unit area of the formation surface. The formed amount of the adhesive layer can be calculated by dividing the mass of the composition for a secondary battery adhesive layer that is required to form the adhesive layer on the formation surface by the area of the formation surface on which the adhesive layer is formed.

In a case in which the dotted adhesive layer is preferably formed at two or more locations on the formation surface, the size of one dot formed on the formation surface (hereinafter, referred to as the "formation area") is preferably 25 $\mu m^2$ or more, more preferably 50 $\mu m^2$ or more, and even more preferably 100 $\mu m^2$ or more, and is preferably 250,000 $\mu m^2$ or less, more preferably 200,000 $\mu m^2$ or less, and even more preferably 100,000 $\mu m^2$ or less. When the size of one dot is 25 $\mu m^2$ or more, the battery member for a secondary battery and an adhesion target member can be even more strongly adhered via the adhesive layer. Moreover, when the size of one dot is 250,000 $\mu m^2$ or less, the battery member for a secondary battery can be efficiently produced.

Note that the formation area can be adjusted by altering the amount, shape, and range of supply of the presently disclosed composition for a secondary battery adhesive layer to the formation surface. Specifically, in a case in which the adhesive layer is formed by an inkjet method using the presently disclosed composition for a secondary battery adhesive layer, for example, the formation area can be adjusted by altering the gradation of ejection of the composition for a secondary battery adhesive layer from nozzles of an inkjet head (i.e., the number of ejections at the same point).

(Production Method of Battery Member for Non-Aqueous Secondary Battery)

The presently disclosed method of producing a battery member for a non-aqueous secondary battery (hereinafter, also referred to simply as a "method of producing a battery member for a secondary battery") is a method of producing the presently disclosed battery member for a secondary battery set forth above. Specifically, the presently disclosed method of producing a battery member for a secondary battery includes: an application step of, with respect to a porous membrane layer-equipped substrate having a porous membrane layer formed on at least one surface of a substrate, applying the presently disclosed composition for a secondary battery adhesive layer onto the porous membrane layer of the porous membrane layer-equipped substrate by an inkjet method; and a drying step of drying the composition for a secondary battery adhesive layer that has been applied onto the porous membrane layer to form an adhesive layer. The presently disclosed method of producing a battery member for a secondary battery can also optionally include a porous membrane layer-equipped substrate production step of producing the porous membrane layer-equipped substrate before the application step.

<Porous Membrane Layer-Equipped Substrate Production Step>

In the porous membrane layer-equipped substrate production step, a porous membrane layer is formed on at least one surface of a substrate to produce a porous membrane layer-equipped substrate. The porous membrane layer-equipped substrate can be obtained by, for example, applying a composition for a porous membrane layer onto a substrate such as a separator substrate or an electrode substrate and then drying the composition for a porous membrane layer that has been applied.

[Composition for Porous Membrane Layer]

The composition for a porous membrane layer normally contains non-conductive inorganic particles, a polymer for a porous membrane layer, and a solvent, such as an organic solvent and/or water, and can optionally contain other components.

—Non-Conductive Inorganic Particles—

The non-conductive inorganic particles contained in the composition for a porous membrane layer are preferably particles formed of an inorganic material that is electrochemically stable and is stably present in the environment of use of a secondary battery, and are more preferably particles formed of an inorganic compound. Examples of non-conductive inorganic particles that are preferable from such viewpoints include particles of inorganic oxides such as aluminum oxide (alumina), hydrous aluminum oxide (boehmite (AlOOH), gibbsite ($Al(OH)_3$)), silicon oxide, magnesium oxide (magnesia), magnesium hydroxide, calcium oxide, titanium oxide (titania), barium titanate ($BaTiO_3$), ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. Of these examples, the non-conductive inorganic particles are preferably inorganic oxide particles from a viewpoint of causing good adsorption of the polymer for a porous membrane layer and inhibiting increased internal resistance of a battery member including the porous membrane layer, and are more preferably alumina particles, boehmite particles, or titanium oxide particles.

These particles may be subjected to element substitution, surface treatment, solid solution treatment, or the like as necessary. One of these types of particles may be used individually, or two or more of these types of particles may be used in combination.

—Density—

The density of the non-conductive inorganic particles is preferably 3.0 $g/cm^3$ or more, and more preferably 3.5 $g/cm^3$ or more, and is preferably 6.0 g/cm$^3$ or less, and more preferably 5.0 g/cm$^3$ or less. When the density of the non-conductive inorganic particles is not less than any of the lower limits set forth above, the density of the porous membrane layer can be sufficiently increased. Moreover, when the density of the non-conductive inorganic particles is not more than any of the upper limits set forth above, low-temperature output characteristics of a secondary battery that includes a battery member including the porous membrane layer can be further improved.

The "density of the non-conductive inorganic particles" referred to in the present disclosure is the true density measured at a temperature of 25° C. by the gas displacement method.

—Volume-Average Particle Diameter—

The volume-average particle diameter of the non-conductive inorganic particles is preferably 0.1 μm or more, and more preferably 0.2 μm or more, and is preferably 1.0 μm or less, and more preferably 0.8 μm or less. When the volume-average particle diameter of the non-conductive inorganic particles is not less than any of the lower limits set forth above, increased Gurley value (i.e., reduced ion conductivity) of the porous membrane layer can be inhibited, and low-temperature output characteristics of a secondary battery that includes a battery member including the porous membrane layer can be further improved. Moreover, when the volume-average particle diameter of the non-conductive inorganic particles is not more than any of the upper limits set forth above, the polymer for a porous membrane layer can be caused to adsorb well to the non-conductive inorganic particles, and the polymer for a porous membrane layer can be inhibited from entering (infiltrating) an electrode mixed material layer during formation of the porous membrane layer in a situation in which an electrode substrate is used as the substrate.

Note that the "volume-average particle diameter of the non-conductive inorganic particles" referred to in the present disclosure is the particle diameter (D50) at which, in a particle diameter distribution (by volume) measured by laser diffraction in accordance with JIS Z8825, cumulative volume calculated from the small-diameter end of the distribution reaches 50%.

—Polymer for Porous Membrane Layer—

The polymer for a porous membrane layer contained in the composition for a porous membrane layer holds components contained in the porous membrane layer so that the components do not become detached from the porous membrane layer. A polymer such as described in JP2017-084589A, for example, can suitably be used as the polymer for a porous membrane layer. Moreover, the polymer for a porous membrane layer can be produced with reference to a polymer production method described in the aforementioned publication.

[Amount]

The amount of the polymer for a porous membrane layer that is contained in the composition for a porous membrane layer per 100 parts by mass of the non-conductive inorganic particles is preferably 0.1 parts by mass or more, more preferably 0.5 parts by mass or more, and even more preferably 1 part by mass or more, and is preferably 5 parts by mass or less, more preferably 4 parts by mass or less, and even more preferably 2.5 parts by mass or less. When the content of the polymer for a porous membrane layer is within any of the ranges set forth above, the composition for a porous membrane layer can be provided with a suitable viscosity, and dispersibility and coatability of the composition for a porous membrane layer can be further improved. Moreover, when the content of the polymer for a porous membrane layer is not less than any of the lower limits set forth above, dusting resistance of the porous membrane layer can be sufficiently improved. Furthermore, when the content of the polymer for a porous membrane layer is not more than any of the upper limits set forth above, increased internal resistance of a battery member can be inhibited, and low-temperature output characteristics of a secondary battery can be sufficiently improved when an electrode substrate is used as the substrate.

—Organic Solvent—

The organic solvent contained in the composition for a porous membrane layer is not specifically limited and examples thereof include alcohols such as methanol, ethanol, n-propanol, isopropanol, n-butanol, isobutanol, t-butanol, pentanol, hexanol, heptanol, octanol, nonanol, decanol, and amyl alcohol, ketones such as acetone, methyl ethyl ketone, and cyclohexanone, esters such as ethyl acetate and butyl acetate, ethers such as diethyl ether, dioxane, and tetrahydrofuran, amide polar organic solvents such as N,N-dimethylformamide and N-methylpyrrolidone (NMP), and aromatic hydrocarbons such as toluene, xylene, chlorobenzene, ortho-dichlorobenzene, and para-dichlorobenzene. One of these organic solvents may be used individually, or two or more of these organic solvents may be used as a mixture.

Of these examples, acetone and NMP are preferable as the organic solvent, and NMP is more preferable as the organic solvent.

—Other Components—

The composition for a porous membrane layer may contain any other components besides the components set forth above. Commonly known components can be used as these other components without any specific limitations so long as they do not affect battery reactions. Moreover, one of these other components may be used individually, or two or more of these other components may be used in combination.

Examples of other components include the previously described additives that can be contained in the presently disclosed composition for a secondary battery adhesive layer, for example.

[Production Method of Composition for Porous Membrane Layer]

Although no specific limitations are placed on the method by which the composition for a porous membrane layer is produced, the composition for a porous membrane layer is normally produced by mixing the above-described non-conductive inorganic particles, polymer for a porous membrane layer, organic solvent, and other components that are used as necessary. The method of mixing is not specifically limited, but mixing is normally performed using a disperser as a mixing device in order to efficiently disperse and mix the components.

Note that in a case in which the composition for a porous membrane layer is produced using a polymer that has been produced in water by emulsion polymerization or the like, the water used in production of the polymer for a porous membrane layer may be removed prior to mixing with the organic solvent or may be removed through evaporation of the water after a water dispersion of the polymer for a porous membrane layer and the organic solvent have been mixed.

«Application of Composition for Porous Membrane Layer»

Examples of methods by which the composition for a porous membrane layer set forth above can be applied onto a substrate of a separator substrate or an electrode substrate include, but are not specifically limited to, doctor blading, reverse roll coating, direct roll coating, gravure coating, extrusion coating, and brush coating.

«Drying of Composition for Porous Membrane Layer»

Any commonly known method can be adopted without any specific limitations as the method by which the composition for a porous membrane layer that has been applied onto the substrate is dried. Specific examples of drying methods that can be used include drying by warm, hot, or low-humidity air, drying in a vacuum, and drying by irradiation with infrared light, electron beams, or the like. Although no specific limitations are placed on the drying conditions, the drying temperature is preferably 50° C. to 150° C., and the drying time is preferably 5 minutes to 30 minutes.

[Thickness of Porous Membrane Layer]

The thickness of the porous membrane layer formed through drying of the composition for a porous membrane layer is not specifically limited but is preferably not less than 0.3 μm and not more than 10 μm. When the thickness of the porous membrane layer is 0.3 μm or more, heat resistance and strength of the porous membrane layer can be further improved. Moreover, when the thickness of the porous membrane layer is 10 μm or less, a secondary battery can be caused to display excellent rate characteristics.

<Application Step>

In the presently disclosed method of producing a battery member for a secondary battery, an inkjet method is used to apply the presently disclosed composition for a secondary battery adhesive layer onto the porous membrane layer of the porous membrane layer-equipped substrate that has been obtained as described above, for example.

Note that the inkjet conditions and other such conditions are not specifically limited so long as the conditions enable application of the composition for a secondary battery adhesive layer and can be adjusted as appropriate depending on the desired properties (formed amount, formation area, etc.) of the adhesive layer that is to be obtained but are preferably conditions that enable application of the composition for a secondary battery adhesive layer in a dotted form.

<Drying Step>

In the presently disclosed method of producing a battery member for a secondary battery, the composition for a secondary battery adhesive layer that has been applied onto the porous membrane layer is dried in the drying step. In this manner, an adhesive layer is formed in plurality in a dotted form, for example, on the porous membrane layer-equipped substrate.

Drying of the composition for a secondary battery adhesive layer can be performed using a heating device such as a heater, a dryer, or a heat roller without any specific limitations. The temperature during drying of the porous membrane layer that has been coated with the composition for a secondary battery adhesive layer is not specifically limited but is preferably 0° C. or higher, more preferably 10° C. or higher, and even more preferably 15° C. or higher, and is preferably 200° C. or lower, more preferably 150° C. or lower, and even more preferably 100° C. or lower. A temperature of 0° C. or higher during drying can sufficiently increase the drying rate and enables efficient production of a battery member for a secondary battery. Moreover, a temperature of 200° C. or lower during drying can improve the shape of an adhesive layer obtained after the drying and enables good adhesion of a battery member that includes the porous membrane layer with another battery member.

(Production Method of Laminate for Non-Aqueous Secondary Battery)

The presently disclosed method of producing a laminate for a non-aqueous secondary battery includes: an application step of, with respect to a porous membrane layer-equipped substrate having a porous membrane layer formed on at least one surface of a substrate, applying the presently disclosed composition for a secondary battery adhesive layer set forth above onto the porous membrane layer of the porous membrane layer-equipped substrate by an inkjet method; a drying step of drying the composition for a secondary battery adhesive layer that has been applied onto the porous membrane layer to form an adhesive layer; and an adhering step of adhering the porous membrane layer-equipped substrate and an adhesion target member via the adhesive layer, wherein the substrate is a separator substrate or an electrode substrate.

<Application Step>

In the application step, an inkjet method is used to apply the presently disclosed composition for a secondary battery adhesive layer set forth above onto a porous membrane layer of a porous membrane layer-equipped substrate having a porous membrane layer formed on at least one surface of a substrate. Note that the porous membrane layer-equipped substrate is not specifically limited and may be the porous membrane layer-equipped substrate that was described in the "Battery member for secondary battery" section. Moreover, conditions that were described in the "Production method of battery member for secondary battery" section can be adopted as the inkjet conditions and other such conditions. Furthermore, the separator substrate or electrode substrate serving as the substrate can be the separator substrate or the electrode substrate that was described in the "Battery member for secondary battery" section.

<Drying Step>

In the drying step, the composition for a secondary battery adhesive layer that has been applied onto the porous membrane layer is dried to form an adhesive layer. No specific limitations are placed on the drying of the composition for a secondary battery adhesive layer, and the drying method and drying time that were described in the "Production method of battery member for secondary battery" section can be adopted.

<Adhering Step>

In the adhering step, the porous membrane layer-equipped substrate and an adhesion target member are adhered via the adhesive layer that has been formed on the porous membrane layer of the porous membrane layer-equipped substrate. The method of adhering is not specifically limited and can be performed by overlapping the porous membrane layer-equipped substrate and the adhesion target member via the adhesive layer and performing pressing thereof, for example. In a case in which the porous membrane layer-equipped substrate is a porous membrane layer-equipped separator substrate, an electrode (positive electrode or negative electrode) can be used as the adhesion target member.

(Production Method of Non-Aqueous Secondary Battery)

A feature of the presently disclosed method of producing a non-aqueous secondary battery is that a laminate for a non-aqueous secondary battery produced by the method of producing a laminate for a non-aqueous secondary battery set forth above is used therein. More specifically, a non-aqueous secondary battery obtained by the presently disclosed production method is a non-aqueous secondary battery that includes a positive electrode, a negative electrode, a separator, and an electrolyte solution, for example, and in which the positive electrode and the separator and/or the negative electrode and the separator are adhered via an adhesive layer that has been formed on a porous membrane layer by an inkjet method. Moreover, the presently disclosed non-aqueous secondary battery is a non-aqueous secondary battery in which the laminate for a non-aqueous secondary battery set forth above is used as a positive electrode and a separator that are adhered via an adhesive layer on a porous membrane layer and/or as a negative electrode and a separator that are adhered via an adhesive layer on a porous membrane layer. The presently disclosed non-aqueous secondary battery has excellent low-temperature output characteristics as a result of the presently disclosed composition for a non-aqueous secondary battery adhesive layer being used to strongly adhere a separator and an electrode (positive electrode or negative electrode) via an adhesive layer formed on a porous membrane layer.

Note that in a case in which a positive electrode, negative electrode, separator, or the like other than the laminate for a non-aqueous secondary battery set forth above is used in the non-aqueous secondary battery (for example, a case in which the secondary battery is formed using a negative electrode and a laminate in which a positive electrode substrate and a separator substrate are adhered via a porous membrane layer), the positive electrode, negative electrode, or separator can be any known positive electrode, negative electrode, or separator that is used in a non-aqueous secondary battery. Moreover, the electrolyte solution can be any known electrolyte solution that is used in a non-aqueous secondary battery.

An organic electrolyte solution obtained by dissolving a supporting electrolyte in an organic solvent is normally used as the electrolyte solution. The supporting electrolyte can be a lithium salt in a case in which the secondary battery is a lithium ion secondary battery, for example. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of organic solvents that can suitably be used in a case in which the secondary battery is a lithium ion secondary battery, for example, include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Moreover, a mixture of these organic solvents may be used. Of these solvents, carbonates are preferable due to having high permittivity and a wide stable potential region.

The presently disclosed non-aqueous secondary battery can be produced by, for example, performing rolling, folding, or the like, as necessary in accordance with the battery shape, with respect to a laminate for a non-aqueous secondary battery produced by the presently disclosed method of producing a laminate for a non-aqueous secondary battery set forth above or a product obtained by stacking the laminate for a non-aqueous secondary battery with a positive electrode, negative electrode, separator, or the like other than the laminate for a non-aqueous secondary battery, placing the resultant product in a battery container, injecting the electrolyte solution into the battery container, and sealing the battery container.

An overcurrent preventing device such as a fuse or a PTC device, an expanded metal, a lead plate, or the like may be provided in the presently disclosed secondary battery as necessary in order to prevent pressure increase inside the secondary battery and occurrence of overcharging or overdischarging. The shape of the secondary battery may be a coin type, button type, sheet type, cylinder type, prismatic type, flat type, or the like.

Examples

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the degree of swelling in electrolyte solution of a polymer forming organic particles (polymer of a core portion and polymer of a shell portion), the glass-transition temperature (Tg) of each polymer forming organic particles (polymer of a core portion and polymer of a shell portion) and another binder, the volume-average particle diameter (D50), core-shell ratio, and ratio of coverage of organic particles, the viscosity, surface tension, ejection performance (inhibition of nozzle clogging), adhesive strength A (dry adhesive strength of a separator and an electrode), and adhesive strength B (dry adhesive strength of a porous membrane layer-equipped separator and an electrode) of a composition for a secondary battery adhesive layer, and the low-temperature output characteristics of a secondary battery.

<Degree of Swelling in Electrolyte Solution>

A water dispersion containing a polymer of a core portion and a water dispersion containing a polymer of a shell portion were produced under the same polymerization conditions as for a core portion and a shell portion of organic particles using the monomers, various additives, and so forth used to form the core portion and the shell portion of the organic particles. Each of the water dispersions was loaded into a petri dish made of polytetrafluoroethylene and was dried under conditions of 25° C. for 48 hours. A powder obtained through the drying was hot pressed at 200° C. to obtain a film of 0.5 mm in thickness. The obtained film was then cut into a 1 cm square to obtain a test specimen, and the weight W2 (g) of the test specimen was measured. Next, the test specimen was immersed into electrolyte solution at 60° C. for 72 hours. Thereafter, the test specimen was removed from the electrolyte solution, electrolyte solution on the surface of the test specimen was wiped off, and the weight W3 (g) of the test specimen was measured. The degree of swelling in electrolyte solution (factor) was calculated by the following formula.

Degree of swelling in electrolyte solution (factor)=$W3/W2$

Note that an electrolyte solution obtained by dissolving $LiPF_6$ as a supporting electrolyte with a concentration of 1 mol/L in a mixed solvent in which ethylene carbonate (EC), diethyl carbonate (DEC), and vinylene carbonate (VC) were mixed in a volume ratio of EC/DEC/VC=68.5/30/1.5 was used as an electrolyte solution for measurement.

<Glass-Transition Temperature (Tg)>

Water dispersions each containing a polymer (polymer of a core portion or polymer of a shell portion) were produced under the same polymerization conditions as for a core portion and a shell portion of organic particles using the monomers, various additives, and so forth used to form the core portion and the shell portion of the organic particles, and then the water dispersions were dried to obtain measurement samples (1). In addition, a water dispersion containing another binder was produced and was then dried to obtain a measurement sample (2). For each of the measurement samples, 10 mg thereof was weighed into an aluminum pan and was then measured by a differential scanning calorimeter (EXSTAR DSC6220 produced by SII Nano-Technology Inc.) under conditions prescribed by JIS Z 8703 with a measurement temperature range of −100° C. to 500° C. and a heating rate of 10° C./min, and using an empty aluminum pan as a reference, to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter (D50) of Organic Particles>

A laser diffraction particle diameter distribution analyzer (produced by Beckman Coulter, Inc.; product name: LS-230) was used to measure a particle diameter distribution (by volume) with respect to a water dispersion of organic particles that had been adjusted to a solid content concentration of 0.1 mass %. In the measured particle diameter distribution, the particle diameter at which the cumulative volume calculated from a small-diameter end of the distribution reached 50% was taken to be the volume average particle diameter (D50).

<Core-Shell Ratio of Organic Particles>

The core-shell ratio of organic particles was measured by the following procedure.

Produced organic particles were sufficiently dispersed in visible light-curable epoxy resin (D-800 produced by JEOL Ltd.) and were then embedded to obtain a block piece containing the organic particles. A thin slice of 100 nm thickness was then cut from the block piece using a microtome equipped with a diamond blade to prepare a measurement sample. Thereafter, the measurement sample was subjected to dyeing treatment using ruthenium tetroxide.

Next, the measurement sample that had undergone dyeing treatment was set in a transmission electron microscope (JEM-3100F produced by JEOL Ltd.) and micrographs of cross-sectional structure of the organic particles were recorded with an accelerating voltage of 80 kV. The magnification of the electron microscope was set such that a cross-section of one organic particle was within the field of view. The recorded cross-sectional structure of the organic particles was observed and the average thickness of a shell portion of the organic particles was measured by the following procedure in accordance with the observed configuration of the shell portion.

«Measurement of Average Thickness of Shell Portion»

The average thickness of the shell portion was determined through observation of cross-sectional structure of the organic particles using a transmission electron microscope (TEM). Specifically, the maximum shell portion thickness in the cross-sectional structure of an organic particle was measured using the TEM, and an average value for the maximum shell portion thickness of 20 or more arbitrarily selected organic particles was taken to be the average thickness of the shell portion. Note that in a case in which the shell portion was composed of particles of a polymer and was formed by a single layer of the polymer particles in which the particles forming the shell portion did not overlap in a radial direction of the organic particle, the average thickness of the shell portion was taken to be the number-average particle diameter of the particles forming the shell portion. The core-shell ratio of the organic particles was determined by dividing the average thickness of the shell portion that had been measured by the volume-average particle diameter (D50) of the organic particles.

<Ratio of Coverage of Organic Particles>

The ratio of coverage of organic particles was measured by the following procedure.

A micrograph of cross-sectional structure of an organic particle was recorded in the same way as in the measurement method of the core-shell ratio of organic particles. The length D1 of the circumference of a core portion and the length D2 of sections where a shell portion was in contact with an outer surface of the core portion were measured in the recorded cross-sectional structure of the organic particle, and the proportion of the outer surface of the core portion of the organic particle that was covered by the shell portion (covered proportion Rc (%)=(D2/D1)×100) was calculated.

This covered proportion Rc was measured for 20 arbitrarily selected organic particles, the average value thereof was taken to be an average proportion of the outer surface of the core portion covered by the shell portion in the organic particles, and this average proportion was taken to be the ratio of coverage of the organic particles.

<Viscosity of Composition for Secondary Battery Adhesive Layer>

A rheometer (MCR502 produced by Anton Paar GmbH) was used to measure the viscosity $\eta_0$ at a shear rate of 100 s$^{-1}$ and the viscosity $\eta_1$ at a shear rate of 10,000 s$^{-1}$ at a temperature of 25° C. The obtained values for the viscosity $\eta_0$ and the viscosity $\eta_1$ were used to calculate the ratio ($\eta_0/\eta_1$) of the viscosity $\eta_0$ relative to the viscosity $\eta_1$.

<Surface Tension of Composition for Secondary Battery Adhesive Layer>

A produced composition for a secondary battery adhesive layer was poured onto a glass petri dish. Surface tension measurement was performed by the plate method using a platinum plate. This measurement was performed twice using a fully automatic surface tensiometer "CBVP-Z" produced by Kyowa Interface Science Co., Ltd., an average value for the surface tension was determined from the measured values, and the average value was taken to be the surface tension of the composition for a secondary battery adhesive layer.

<Ejection Performance (Inhibition of Nozzle Clogging)>

A composition for a secondary battery adhesive layer was ejected using an inkjet-type slurry feeder including an inkjet head (KM1024 (shear-mode type) produced by Konica) under conditions such that the projection velocity was 6 m/s to 10 m/s. Nozzle clogging was evaluated by the following standard based on whether ejection could be restarted after suspension of ejection and subsequent resting. A longer resting time indicates better ejection performance.

A: Ejection can be restarted even after 30 minutes or more of resting time

B: Ejection can be restarted after resting time of less than 20 minutes but cannot be restarted due to nozzle clogging after resting time of not less than 20 minutes and less than 30 minutes C: Ejection can be restarted after resting time of less than 10 minutes but cannot be restarted due to nozzle clogging after resting time of not less than 10 minutes and less than 20 minutes D: Ejection cannot be restarted due to nozzle clogging after resting time of less than 10 minutes <Evaluation of adhesive strength A (dry adhesive strength of separator and electrode)>

An obtained laminate A was placed with the surface at the current collector side of the electrode (negative electrode) facing downward, and cellophane tape was affixed to the surface of the electrode (negative electrode). Tape prescribed by JIS Z1522 was used as the cellophane tape. Moreover, the cellophane tape was secured to a horizontal test stage in advance. The stress when the separator was peeled off by pulling one end of the separator vertically upward at a pulling speed of 50 mm/min was measured.

A total of 6 measurements were performed in this manner, an average value of the stress was determined as the peel strength, and adhesiveness of the separator substrate and the electrode (negative electrode) via the adhesive layer was evaluated by the following standard. A larger peel strength indicates higher adhesiveness of the separator and the electrode (negative electrode) via the adhesive layer.

A: Peel strength of 1.5 N/m or more

B: Peel strength of not less than 1.0 N/m and less than 1.5 N/m

C: Peel strength of not less than 0.5 N/m and less than 1.0 N/m

D: Peel strength of less than 0.5 N/m

<Evaluation of Adhesive Strength B (Dry Adhesive Strength of Porous Membrane Layer-Equipped Separator and Electrode)>

An obtained laminate B was placed with the surface at the current collector side of the electrode (negative electrode) facing downward, and cellophane tape was affixed to the surface of the electrode (negative electrode). Tape prescribed by JIS Z1522 was used as the cellophane tape. Moreover, the cellophane tape was secured to a horizontal test stage in advance. The stress when the porous membrane layer-equipped separator was peeled off by pulling one end of the porous membrane layer-equipped separator vertically upward at a pulling speed of 50 mm/min was measured.

A total of 6 measurements were performed in this manner, an average value of the stress was determined as the peel strength, and adhesiveness of the porous membrane layer-equipped separator and the electrode (negative electrode) via the adhesive layer on the porous membrane layer was evaluated by the following standard. A larger peel strength indicates higher adhesiveness of the porous membrane layer-equipped separator and the electrode (negative electrode) via the adhesive layer on the porous membrane layer.

A: Peel strength of 1.5 N/m or more

B: Peel strength of not less than 1.0 N/m and less than 1.5 N/m

C: Peel strength of not less than 0.5 N/m and less than 1.0 N/m

D: Peel strength of less than 0.5 N/m

<Low-Temperature Output Characteristics of Secondary Battery>

A produced secondary battery was constant-current constant-voltage (CCCV) charged to 4.3 V in an atmosphere having a temperature of 25° C. Thereafter, the electric capacity upon discharge to 3.0 V by a 0.2C constant-current method and the electric capacity upon discharge to 3.0 V by a 1C constant-current method were determined in an atmosphere having a temperature of −10° C.

A ratio of the electric capacities (=(electric capacity at 1C/electric capacity at 0.2C)×100(%)) was calculated. These measurements were performed for 5 secondary battery cells, and an average value of the ratio of the electric capacities for these cells was evaluated by the following standard as a discharge capacity maintenance rate. A larger value for the discharge capacity maintenance rate indicates better low-temperature output characteristics.

A: Discharge capacity maintenance rate of 80% or more

B: Discharge capacity maintenance rate of not less than 70% and less than 80%

C: Discharge capacity maintenance rate of not less than 60% and less than 70%

D: Discharge capacity maintenance rate of less than 60%

Example 1

<Production of Organic Particles Having Core-Shell Structure>

First, in core portion formation, 88 parts of styrene as an aromatic vinyl monomer, 6 parts of n-butyl acrylate as a (meth)acrylic acid ester monomer, 5 parts of methacrylic acid as an acid group-containing monomer, 1 part of ethylene glycol dimethacrylate as a cross-linkable monomer, 1 part of sodium dodecylbenzenesulfonate as an emulsifier, 150 parts of deionized water, and 0.5 parts of potassium persulfate as a polymerization initiator were loaded into a 5 MPa pressure vessel equipped with a stirrer, were sufficiently stirred, and were then heated to 60° C. to initiate polymerization. At the point at which the polymerization conversion rate reached 96%, 80.7 parts of n-butyl acrylate as a (meth)acrylic acid ester monomer, 1 part of methacrylic acid as an acid group-containing monomer, 18 parts of styrene as an aromatic vinyl monomer, and 0.3 parts of allyl methacrylate as a cross-linkable monomer were continuously added for shell portion formation, and polymerization was continued under heating to 70° C. Cooling was performed to quench the reaction to yield a water dispersion containing organic particles having a core-shell structure at the point at which the polymerization conversion rate reached 96%. The degree of swelling in electrolyte solution of the core portion and the shell portion, the glass-transition temperature of the core portion and the shell portion, the volume-average particle diameter, the core-shell ratio, and the ratio of coverage for the obtained organic particles are shown in Table 1.

<Production of Other Binder>

A reactor including a stirrer was charged with 70 parts of deionized water, 0.15 parts of sodium lauryl sulfate (EMAL 2F produced by Kao Corporation) as an emulsifier, and 0.5 parts of ammonium persulfate, the gas phase was purged with nitrogen gas, and heating was performed to 60° C.

Meanwhile, a monomer mixture was obtained in a separate vessel by mixing 50 parts of deionized water, 0.5 parts of sodium dodecylbenzenesulfonate as an emulsifier, and 94 parts of n-butyl acrylate, 2 parts of acrylonitrile, 2 parts of methacrylic acid, 1 part of N-hydroxymethylacrylamide, and 1 part of allyl glycidyl ether as polymerizable monomers. The monomer mixture was continuously added to the reactor over 4 hours to carry out polymerization. The reaction was carried out at 60° C. during the addition. Once the addition was completed, a further 3 hours of stirring was performed at 70° C. to complete the reaction and thereby produce a water dispersion containing an acrylic polymer as another binder. This water dispersion was used to measure the glass-transition temperature of the other binder (acrylic polymer). The result is shown in Table 1.

<Production of Composition for Secondary Battery Adhesive Layer>

Mixing of 100 parts (in terms of solid content) of the water dispersion of the organic particles having a core-shell structure that was obtained as described above and 15 parts (in terms of solid content) of the water dispersion of the other binder (acrylic polymer) was performed inside a stirring vessel. A composition for a secondary battery adhesive layer having a solid content concentration of 4% was then obtained by adding 0.1 parts (in terms of solid content) of a water dispersion of cellulose nanofiber (WFo-1002 produced by Sugino Machine Limited) as a thixotropic agent and 0.3 parts (in terms of solid content) of an aqueous solution of a polyoxyalkylene derivative non-ionic surfactant (LS-106 produced by Kao Corporation) as a surface tension modifier to the resultant mixture, and further adding deionized water. This composition for a secondary battery adhesive layer was used to measure the viscosity $\eta_0$ at a shear rate of 100 s$^{-1}$, the viscosity $\eta_1$ at a shear rate of 10,000 s$^{-1}$, and the surface tension, and to determine the ratio of the viscosity $\eta_0$ relative to the viscosity qi. Ejection performance (nozzle clogging) was also evaluated. The results are shown in Table 1.

<Production of Composition for Porous Membrane Layer>

Mixing was performed of 100 parts of alumina (AKP3000 produced by Sumitomo Chemical Co., Ltd.; volume-average particle diameter: 0.5 μm) as non-conductive particles, 1.0 parts of ammonium polycarboxylate (ARON A-6114 produced by Toagosei Co., Ltd.) as a dispersant, and water. The amount of water was adjusted such that the solid content concentration was 50%. A medialess dispersing device was used to treat the mixture and disperse the alumina. Next, 1.5 parts (in terms of solid content) of an aqueous solution in which carboxymethyl cellulose (DAICEL 1220 produced by Daicel Corporation) was dissolved was added to the resultant dispersion liquid as a thixotropic agent and was mixed therewith. The added thixotropic agent (carboxymethyl cellulose) was dissolved in the mixture. Next, 3 parts (in terms of solid content) of a water dispersion of an acrylic copolymer as a polymer for a porous membrane layer and 0.2 parts of an aliphatic polyether non-ionic surfactant as a surface tension modifier were added, and water was further added to adjust the solid content concentration to 40% and thereby obtain a composition for a porous membrane layer.

<Production of Porous Membrane Layer-Equipped Separator>

The produced composition for a porous membrane layer was sealed in a polyethylene vessel and was left at rest for 30 days. Thereafter, an impeller was inserted into the polyethylene vessel and was used to perform stirring at a rotation speed of 250 rpm. The stirring was continued for 30 minutes after solid deposits could no longer be seen at the bottom of the vessel to redisperse the non-conductive particles (alumina) in the composition for a porous membrane layer.

In addition, a single-layered polyethylene separator substrate (width: 250 mm; length: 1,000 mm; thickness: 12 μm) that had been produced by a wet method was prepared. A gravure coater (coating rate: 20 m/min) was used to apply the redispersed composition for a porous membrane layer onto one surface of the separator substrate such that the thickness after drying was 2.5 μm. Next, the separator substrate with the composition for a porous membrane layer applied thereon was dried in a 50° C. drying oven and was then wound up to obtain a porous membrane layer-equipped separator having a porous membrane layer formed on one surface of the separator substrate.

<Production of Porous Membrane Layer-Equipped Separator on which Adhesive Layer has been Formed>

The produced composition for a secondary battery adhesive layer was ejected onto the porous membrane layer of the porous membrane layer-equipped separator obtained as described above using an inkjet-type slurry feeder including an inkjet head (KM1024 (shear-mode type) produced by Konica) under conditions such that the projection velocity was 6 m/s to 10 m/s, and then the ejected composition for a secondary battery adhesive layer was dried. In this manner, a porous membrane layer-equipped separator having an adhesive layer formed in plurality in a dotted form on the porous membrane layer was obtained.

<Production of Positive Electrode>

A slurry composition for a positive electrode was obtained by loading 100 parts of LiCoO$_2$ (volume-average particle diameter (D50): 12 μm) as a positive electrode active material, 2 parts of acetylene black (HS-100 produced by Denka Company Limited) as a conductive material, 2 parts in terms of solid content of polyvinylidene fluoride (#7208 produced by Kureha Corporation) as a binder for a positive electrode mixed material layer, and N-methylpyrrolidone into a planetary mixer such that the total solid content concentration was 70% and performing mixing thereof.

The obtained slurry composition for a positive electrode was applied onto aluminum foil of 20 μm in thickness serving as a current collector by a comma coater such as to have a thickness after drying of approximately 150 μm and was dried to obtain a positive electrode web. The drying was performed by conveying the aluminum foil inside a 60° C. oven for 2 minutes at a speed of 0.5 m/min. The positive electrode web was subsequently rolled by roll pressing to obtain a positive electrode including a positive electrode mixed material layer of 95 μm in thickness.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium peroxodisulfate as a polymerization initiator. These materials were sufficiently stirred and were then heated to 50° C. to initiate polymerization. At the point at which the polymerization conversion rate reached 96%, cooling was performed to quench the reaction to yield a mixture containing a binder (SBR) for a negative electrode mixed material layer. The mixture containing the binder for a negative electrode mixed material layer was adjusted to pH 8 through addition of 5% sodium hydroxide aqueous solution and was subsequently subjected to thermal-vacuum distillation to remove unreacted monomer. Thereafter, the mixture was cooled to 30° C. or lower to obtain a water dispersion containing the binder for a negative electrode mixed material layer.

In addition, a mixture of 100 parts of artificial graphite (volume-average particle diameter (D50): 15.6 μm) as a negative electrode active material and 1 part in terms of solid content of a 2% aqueous solution of carboxymethyl cellulose sodium salt (MAC350HC produced by Nippon Paper Industries Co., Ltd.) as a thickener was adjusted to a solid content concentration of 68% with deionized water and was then mixed at 25° C. for 60 minutes. The mixture was further adjusted to a solid content concentration of 62% with deionized water and was then mixed at 25° C. for 15 minutes. Deionized water and 1.5 parts in terms of solid content of the binder (SBR) for a negative electrode mixed material layer described above were added, the final solid content concentration was adjusted to 52%, and a further 10 minutes of mixing was performed. The resultant mixture was subjected to a defoaming process under reduced pressure to produce a slurry composition for a negative electrode having good fluidity.

The obtained slurry composition for a negative electrode was applied onto copper foil of 20 μm in thickness serving as a current collector using a comma coater such as to have a thickness after drying of approximately 150 μm and was dried to obtain a negative electrode web. This drying was performed by conveying the copper foil inside a 60° C. oven for 2 minutes at a speed of 0.5 m/min. The negative electrode web was subsequently rolled by roll pressing to obtain a negative electrode including a negative electrode mixed material layer of 100 μm in thickness.

<Production of Laminate A>

The composition for a secondary battery adhesive layer was ejected onto the separator substrate using an inkjet-type slurry feeder including an inkjet head (KM1024 (shear-mode type) produced by Konica) under conditions such that the projection velocity was 6 m/s to 10 m/s and was dried to subsequently form an adhesive layer in plurality in a dotted form on the separator substrate such that the applied amount (i.e., the formed amount of the adhesive layer) was 0.15 g/m$^2$. Note that the size of one formed dot was 15,000 μm$^2$. A separator obtained by forming the adhesive layer on the separator substrate and an electrode (negative electrode) were stacked via the adhesive layer and were held under pressure for 10 seconds with conditions of a heating temperature of 80° C. and a pressing force of 2.5 MPa so as to affix the separator and the electrode and thereby obtain a laminate A. This laminate A was used to evaluate adhesive strength A. The result is shown in Table 1.

<Production of Laminate B>

The composition for a secondary battery adhesive layer was ejected onto the porous membrane layer of the porous membrane layer-equipped separator using an inkjet-type slurry feeder including an inkjet head (KM1024 (shear-mode type) produced by Konica) under conditions such that the projection velocity was 6 m/s to 10 m/s and was dried to subsequently form an adhesive layer in plurality in a dotted form on the porous membrane layer-equipped separator such that the applied amount (formed amount) was 0.15 g/m$^2$. Note that the size of one formed dot was 15,000 μm$^2$. A porous membrane layer-equipped separator obtained by forming the adhesive layer on the porous membrane layer of the porous membrane layer-equipped separator substrate and an electrode (negative electrode) were stacked via the adhesive layer and were held under pressure for 10 seconds with conditions of a heating temperature of 80° C. and a pressing force of 2.5 MPa so as to affix the porous membrane layer-equipped separator and the electrode and thereby obtain a laminate B. This laminate B was used to evaluate adhesive strength B. The result is shown in Table 1.

<Production of Secondary Battery>

An aluminum packing case was prepared as a battery case. A square of 4.6 cm×4.6 cm was cut out from the positive electrode produced as described above for use as a positive electrode for a secondary battery. Moreover, a square of 5.2 cm×5.2 cm was cut out from the porous membrane layer-equipped separator produced as described above for use as a separator for a secondary battery. Furthermore, a square of 5 cm×5 cm was cut out from the negative electrode described above for use as a negative electrode for a secondary battery. The positive electrode for a secondary battery was arranged inside the aluminum packing case such that a surface at the current collector side thereof was in contact with the aluminum packing case. The separator for a secondary battery was then arranged on the surface of the positive electrode mixed material layer of the positive electrode for a secondary battery such that the surface of the porous membrane layer on which the adhesive layer had been formed was in contact with the positive electrode for a secondary battery. In addition, the negative electrode for a secondary battery was arranged on the separator for a secondary battery such that the surface at the negative electrode mixed material layer side thereof faced toward the separator.

Next, electrolyte solution (solvent: ethylene carbonate/methyl ethyl carbonate/vinylene carbonate=68.5/30/1.5 (volume ratio); electrolyte: LiPF$_6$ of 1 mol/L in concentration) was injected such that no air remained. The aluminum packing case was then closed by heat sealing at 150° C. to tightly seal an opening of the aluminum packing case, and thereby produce a lithium ion secondary battery as a secondary battery.

This lithium ion secondary battery was used to evaluate low-temperature output characteristics. The result is shown in Table 1.

Example 2

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that monomers used to form the core portion and the shell portion of the organic particles were changed as shown in Table 1 in production of the composition for a secondary battery adhesive layer. Moreover, various measurements and evaluations were performed in the same way as in Example 1. The results are shown in Table 1.

Example 3

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that cellulose nanofiber used as a thixotropic agent was changed to 0.3 parts of carboxymethyl cellulose in production of the composition for a secondary battery adhesive layer. Moreover, various measurements and evaluations were performed in the same way as in Example 1. The results are shown in Table 1.

Example 4

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that cellulose nanofiber used as a thixotropic agent was changed to 0.05 parts of a (meth)acrylic acid copolymer (PMAA: Polymethacrylic acid) in production of the composition for a secondary battery adhesive layer. Moreover, various measurements and evaluations were performed in the same way as in Example 1. The results are shown in Table 1.

Example 5

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that the content (solid content) of the acrylic polymer used as the other binder was changed as shown in Table 1 in production of the composition for a secondary battery adhesive layer. Moreover, various measurements and evaluations were performed in the same way as in Example 1. The results are shown in Table 1.

Example 6

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that the content (solid content) of the aqueous solution of the polyoxyalkylene derivative non-ionic surfactant used as a surface tension modifier was changed as shown in Table 1 in production of the composition for a secondary battery adhesive layer. Moreover, various measurements and evaluations were performed in the same way as in Example 1. The results are shown in Table 1.

Example 7

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that the content (solid content) of cellulose nanofiber used as a thixotropic agent and the content (solid content) of the polyoxyalkylene derivative non-ionic surfactant used as a surface tension modifier were changed as shown in Table 1 in production of the composition for a secondary battery adhesive layer. Moreover, various measurements and evaluations were performed in the same way as in Example 1. The results are shown in Table 1.

Example 8

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that the content of cellulose nanofiber used as a thixotropic agent was changed as shown in Table 1 in production of the composition for a secondary battery adhesive layer. Moreover, various measurements and evaluations were performed in the same way as in Example 1. The results are shown in Table 1.

Comparative Example 1

Another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that organic particles having a monophase structure (non-core-shell) produced as described below were used instead of organic particles having a core-shell structure. Moreover, various measurements and evaluations were performed in the same way as in Example 1. The results are shown in Table 1.

<Production of Organic Particle Having Monophase Structure (Non-Core-Shell)>

A reactor including a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer mixture was obtained in a separate vessel by mixing 50 parts of deionized water, 0.5 parts of sodium dodecylbenzenesulfonate as an emulsifier, and 40 parts of n-butyl acrylate, 1 part of methacrylic acid, 58 parts of styrene, and 1 part of ethylene glycol dimethacrylate as polymerizable monomers. The monomer mixture was continuously added to the reactor over 2 hours to carry out polymerization. The reaction was carried out at 60° C. during the addition. Once the addition was completed, a further 2 hours of stirring was performed at 70° C. to complete the reaction and thereby produce a water dispersion containing organic particles having a monophase structure (non-core-shell).

Comparative Example 2

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that the content (solid content) of cellulose nanofiber used as a thixotropic agent was changed as shown in Table 1 in production of the composition for a secondary battery adhesive layer. Moreover, various measurements and evaluations were performed in the same way as in Example 1. The results are shown in Table 1.

Comparative Example 3

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that the content (solid content) of cellulose nanofiber used as a thixotropic agent and the content (solid content) of the other binder were changed as shown in Table 1 in production of the composition for a secondary battery adhesive layer. Moreover, various measurements and evaluations were performed in the same way as in Example 1. The results are shown in Table 1.

Comparative Example 4

Organic particles having a core-shell structure, another binder, a composition for a secondary battery adhesive layer, a composition for a porous membrane layer, a porous membrane layer-equipped separator, a porous membrane layer-equipped separator on which an adhesive layer had been formed, a positive electrode, a negative electrode, a laminate A, a laminate B, and a secondary battery were produced or prepared in the same way as in Example 1 with the exception that a thixotropic agent was not used in production of the composition for a secondary battery adhesive layer. Moreover, various measurements and evaluations were performed in the same way as in Example 1. The results are shown in Table 1.

In Table 1, shown below:

"BA" indicates n-butyl acrylate unit;

"MAA" indicates methacrylic acid unit;

"ST" indicates styrene unit;

"AMA" indicates allyl methacrylate unit;

"EDMA" indicates ethylene glycol dimethacrylate unit;

"CNF" indicates cellulose nanofiber;

"PMAA" indicates (meth)acrylic acid copolymer;

"CMC" indicates carboxymethyl cellulose;

"LS-106" indicates aqueous solution of polyoxyalkylene derivative non-ionic surfactant; and "ACL" indicates acrylic polymer.

| | | | | | Example 1 | Example 2 | Example 3 | Example 4 | Example 5 | Example 6 |
|---|---|---|---|---|---|---|---|---|---|---|
| Composition for secondary battery adhesive layer | Organic particles | | Structure | | Core-shell | Core-shell | Core-shell | Core-shell | Core-shell | Core-shell |
| | | Shell | Chemical composition [mass %] | BA | 80.7 | 38.7 | 80.7 | 80.7 | 80.7 | 80.7 |
| | | | | MAA | 1 | 1 | 1 | 1 | 1 | 1 |
| | | | | ST | 18 | 60 | 18 | 18 | 18 | 18 |
| | | | | AMA | 0.3 | 0.3 | 0.3 | 0.3 | 0.3 | 0.3 |
| | | | Degree of swelling in electrolyte solution [factor] | | 1.3 | 2.0 | 1.3 | 1.3 | 1.3 | 1.3 |
| | | | Glass-transition temperature Tg [° C.] | | −34 | 21 | −34 | −34 | −34 | −34 |
| | | Core | Chemical composition [mass %] | ST | 88 | 58 | 88 | 88 | 88 | 88 |
| | | | | BA | 6 | 40 | 6 | 6 | 6 | 6 |
| | | | | MAA | 5 | 1 | 5 | 5 | 5 | 5 |
| | | | | EDMA | 1 | 1 | 1 | 1 | 1 | 1 |
| | | | Degree of swelling in electrolyte solution [factor] | | 9.6 | 2 | 9.6 | 9.6 | 9.6 | 9.6 |
| | | | Glass-transition temperature Tg [° C.] | | 95 | 60 | 95 | 95 | 95 | 95 |
| | | | Core-shell ratio [%] | | 10 | 10 | 10 | 10 | 10 | 10 |
| | | | Ratio of coverage [%] | | 63 | 62 | 63 | 63 | 63 | 63 |
| | | | Volume-average particle diameter [nm] | | 230 | 230 | 230 | 230 | 230 | 230 |
| | Thixotropic agent | | Type | | CNF | CNF | CMC | PMAA | CNF | CNF |
| | | | Content [parts by mass (content per 100 parts by mass of organic particles)] | | 0.1 | 0.1 | 0.3 | 0.05 | 0.1 | 0.1 |
| | Properties | | Viscosity $\eta_0$ at shear rate of 100 $s^{-1}$ [mPa·s] | | 2.5 | 2.5 | 7.1 | 1.5 | 7.6 | 2.5 |
| | | | Viscosity $\eta_1$ at shear rate of 10,000 $s^{-1}$ [mPa·s] | | 0.8 | 0.8 | 1.2 | 0.9 | 2.2 | 0.8 |
| | | | Ratio of $\eta_0$ relative to $\eta_1$ ($\eta_0/\eta_1$) [—] | | 3.1 | 3.1 | 5.9 | 1.7 | 3.5 | 3.1 |
| | | | Surface tension [mN/m] | | 50 | 50 | 54 | 53 | 56 | 36 |

-continued

| | | | | | | | | |
|---|---|---|---|---|---|---|---|---|
| | Surface tension modifier | Type | LS-106 | LS-106 | LS-106 | LS-106 | LS-106 | LS-106 |
| | | Content [parts by mass (content per 100 parts by mass of organic particles)] | 0.3 | 0.3 | 0.3 | 0.3 | 0.3 | 0.6 |
| | | Solid content concentration [%] | 4 | 4 | 4 | 4 | 4 | 4 |
| | Other binder | Type | ACL | ACL | ACL | ACL | ACL | ACL |
| | | Glass-transition temperature Tg [° C.] | −38 | −38 | −38 | −38 | −38 | −38 |
| | | Content [parts by mass (content per 100 parts by mass of organic particles)] | 15 | 15 | 15 | 15 | 30 | 15 |
| Evaluation | | Ejection performance (inhibition of nozzle clogging) | A | A | B | A | B | A |
| | | Adhesive strength A (dry adhesive strength of separator and electrode) | A | B | A | A | A | A |
| | | Adhesive strength B (dry adhesive strength of porous membrane layer-equipped separator and electrode) | A | B | A | B | A | B |
| | | Low-temperature output characteristics | A | B | A | B | A | B |

| | | | | Example 7 | Example 8 | Comparative Example 1 | Comparative Example 2 | Comparative Example 3 | Comparative Example 4 |
|---|---|---|---|---|---|---|---|---|---|
| Composition for secondary battery adhesive layer | Organic particles | Structure | | Core-shell | Core-shell | Non-core-shell | Core-shell | Core-shell | Core-shell |
| | | Shell | Chemical composition [mass %] BA | 80.7 | 80.7 | — | 80.7 | 80.7 | 80.7 |
| | | | MAA | 1 | 1 | — | 1 | 1 | 1 |
| | | | ST | 18 | 18 | — | 18 | 18 | 18 |
| | | | AMA | 0.3 | 0.3 | — | 0.3 | 0.3 | 0.3 |
| | | | Degree of swelling in electrolyte solution [factor] | 1.3 | 1.3 | 1 | 1.3 | 1.3 | 1.3 |
| | | | Glass-transition temperature Tg [° C.] | −34 | −34 | — | −34 | −34 | −34 |
| | | Core | Chemical composition [mass %] ST | 88 | 88 | 58 | 88 | 88 | 88 |
| | | | BA | 6 | 6 | 40 | 6 | 6 | 6 |
| | | | MAA | 5 | 5 | 1 | 5 | 5 | 5 |
| | | | EDMA | 1 | 1 | 1 | 1 | 1 | 1 |
| | | | Degree of swelling in electrolyte solution [factor] | 9.6 | 9.6 | 2 | 9.6 | 9.6 | 9.6 |
| | | | Glass-transition temperature Tg [° C.] | 95 | 95 | 60 | 95 | 95 | 95 |
| | | Core-shell ratio [%] | | 10 | 10 | — | 10 | 10 | 10 |
| | | Ratio of coverage [%] | | 63 | 63 | — | 63 | 63 | 63 |
| | | Volume-average particle diameter [nm] | | 230 | 230 | 230 | 230 | 230 | 230 |
| | Thixotropic agent | Type | | CNF | CNF | CNF | CMC | CNF | — |
| | | Content [parts by mass (content per 100 parts by mass of organic particles)] | | 0.4 | 0.6 | 0.1 | 0.7 | 0.2 | — |
| | Properties | Viscosity $\eta_0$ at shear rate of 100 s$^{-1}$ [mPa · s] | | 6.2 | 9.7 | 2.5 | 11.7 | 9.3 | 0.9 |
| | | Viscosity $\eta_1$ at shear rate of 10,000 s$^{-1}$ [mPa · s] | | 0.9 | 1.0 | 0.8 | 1.5 | 2.5 | 0.8 |
| | | Ratio of $\eta_0$ relative to $\eta_1$ ($\eta_0/\eta_1$) [—] | | 6.9 | 9.7 | 3.1 | 7.8 | 3.7 | 1.1 |
| | | Surface tension [mN/m] | | 58 | 45 | 50 | 55 | 57 | 55 |

-continued

| | | | | | | | |
|---|---|---|---|---|---|---|---|
| Surface tension modifier | Type | LS-106 | LS-106 | LS-106 | LS-106 | LS-106 | LS-106 |
| | Content [parts by mass (content per 100 parts by mass of organic particles)] | 0.02 | 0.3 | 0.3 | 0.3 | 0.3 | 0.3 |
| | Solid content concentration [%] | 4 | 4 | 4 | 4 | 4 | 4 |
| Other binder | Type | ACL | ACL | ACL | ACL | ACL | ACL |
| | Glass-transition temperature Tg [° C.] | −38 | −38 | −38 | −38 | −38 | −38 |
| | Content [parts by mass (content per 100 parts by mass of organic particles)] | 15 | 15 | 15 | 15 | 30 | 15 |
| Evaluation | Ejection performance (inhibition of nozzle clogging) | C | C | A | Cannot be ejected | D | A |
| | Adhesive strength A (dry adhesive strength of separator and electrode) | A | A | D | — | A | A |
| | Adhesive strength B (dry adhesive strength of porous membrane layer-equipped separator and electrode) | A | B | D | — | A | D |
| | Low-temperature output characteristics | A | B | C | — | A | C |

It can be seen from Table 1 that a porous membrane layer-equipped separator and an electrode could be strongly adhered via an adhesive layer formed on the porous membrane layer in Examples 1 to 8 in which the used composition for a secondary battery adhesive layer contained organic particles having a core-shell structure, a thixotropic agent, and water, and had a viscosity $\eta_0$ at a shear rate of 100 s$^{-1}$, a viscosity $\eta_1$ at a shear rate of 10,000 s$^{-1}$, and a ratio ($\eta_0/\eta_1$) of the viscosity $\eta_0$ relative to the viscosity $\eta_1$ that were within specific ranges prescribed in the present disclosure.

On the other hand, it can be seen from Table 1 that a porous membrane layer-equipped separator and an electrode could not be strongly adhered via an adhesive layer formed on the porous membrane layer, and low-temperature output characteristics of an obtained secondary battery deteriorated in Comparative Example 1 in which organic particles having a single structure that was a non-core-shell structure were used.

It can also be seen from Table 1 that good ejection of a composition for a secondary battery adhesive layer by an inkjet method was not possible in Comparative Example 2 in which the used composition for a secondary battery adhesive layer had a viscosity $\eta_0$ at a shear rate of 100 s$^{-1}$ that was outside of the specific range prescribed in the present disclosure and in Comparative Example 3 in which the viscosity $\eta_1$ at a shear rate of 10,000 s$^{-1}$ was outside of the specific range prescribed in the present disclosure.

It can also be seen from Table 1 that a porous membrane layer-equipped separator and an electrode could not be strongly adhered via an adhesive layer formed on the porous membrane layer, and low-temperature output characteristics of an obtained secondary battery deteriorated in Comparative Example 4 in which the used composition for a secondary battery adhesive layer did not contain a thixotropic agent and had a ratio ($\eta_0/\eta_1$) of viscosity $\eta_0$ relative to viscosity $\eta_1$ that was outside of the specific range prescribed in the present disclosure.

INDUSTRIAL APPLICABILITY

According to the present disclosure, it is possible to provide a composition for a secondary battery adhesive layer that, even in a situation in which an inkjet method is used, can efficiently form an adhesive layer on a porous membrane layer of a porous membrane layer-equipped substrate and enables strong adhesion of the porous membrane layer-equipped substrate and an adhesion target member via the adhesive layer.

Moreover, according to the present disclosure, it is possible to provide a battery member for a non-aqueous secondary battery that can strongly adhere to an adhesion target member via an adhesive layer formed on a porous membrane layer of a porous membrane layer-equipped substrate, and also to provide a method of producing this battery member for a non-aqueous secondary battery.

Furthermore, according to the present disclosure, it is possible to provide a method of producing a laminate for a non-aqueous secondary battery that enables efficient production of a laminate for a non-aqueous secondary battery in which a porous membrane layer-equipped substrate and an adhesion target member are strongly adhered via an adhesive layer formed on the porous membrane layer of the porous membrane layer-equipped substrate and that can cause a secondary battery to display excellent low-temperature output characteristics.

Also, according to the present disclosure, it is possible to provide a non-aqueous secondary battery having excellent low-temperature output characteristics.

The invention claimed is:

1. A battery member for a non-aqueous secondary battery comprising:
   a porous membrane layer-equipped substrate having a porous membrane layer formed on at least one surface of a substrate; and
   an adhesive layer formed in plurality in a dotted form on the porous membrane layer, wherein
   the substrate is a separator substrate or an electrode substrate,
   the adhesive layer is a dried product of a composition for a non-aqueous secondary battery adhesive layer, and
   the composition for the non-aqueous secondary battery adhesive layer comprises organic particles, a thixotropic agent, and water, wherein the organic particles have a core-shell structure including a core portion and a shell portion at least partially covering an outer surface of the core portion, the composition for the non-aqueous secondary battery adhesive layer has a viscosity $\eta_0$ at a shear rate of 100 s$^{-1}$ of less than 10 m·Pas, a viscosity $\eta_1$ at a shear rate of 10,000 s$^{-1}$ of not less than 0.5 m·Pas and not more than 2.4 m·Pas, and a ratio $\eta_0/\eta_1$ of the viscosity $\eta_0$ relative to the viscosity $\eta_1$ of not less than 1.2 and not more than 10, the core portion is formed of a polymer having a degree of swelling in electrolyte solution of not less than a factor of 5 and not more than a factor of 30, the polymer forming the core portion has a glass-transition temperature of not lower than −50° C. and not higher than 150° C., a core-shell ratio of the organic particles, which is an average thickness of the shell portion relative to a volume-average particle diameter (D50) of the organic particles, is 1.5% or more and 40% or less, and the viscosity $\eta_0$ and the viscosity Ili are each at a temperature of 25° C.

2. The battery member for the non-aqueous secondary battery according to claim 1, wherein the composition for the non-aqueous secondary battery adhesive layer has a surface tension of not less than 30 mN/m and not more than 60 mN/m.

3. The battery member for the non-aqueous secondary battery according to claim 1, wherein the composition for the non-aqueous secondary battery adhesive layer has a solid content concentration of 30 mass % or less.

4. The battery member for the non-aqueous secondary battery according to claim 1, wherein the shell portion is formed of a polymer having a degree of swelling in electrolyte solution of more than a factor of 1 and not more than a factor of 4, and the polymer forming the shell portion has a glass-transition temperature of at least 10° C. lower than the glass-transition temperature of the polymer forming the core portion.

5. A method of producing a battery member for a non-aqueous secondary battery comprising:

an application step of, with respect to a porous membrane layer-equipped substrate having a porous membrane layer formed on at least one surface of a substrate, applying a composition for a non-aqueous secondary battery adhesive layer onto the porous membrane layer of the porous membrane layer-equipped substrate by an inkjet method; and a drying step of drying the composition for the non-aqueous secondary battery adhesive layer that has been applied onto the porous membrane layer to form an adhesive layer, wherein the substrate is a separator substrate or an electrode substrate, the composition for the non-aqueous secondary battery adhesive layer comprises organic particles, a thixotropic agent, and water, wherein the organic particles have a core-shell structure including a core portion and a shell portion at least partially covering an outer surface of the core portion, the composition for the non-aqueous secondary battery adhesive layer has a viscosity $\eta_0$ at a shear rate of 100 s$^{-1}$ of less than 10 m·Pas, a viscosity $\eta_1$ at a shear rate of 10,000 s$^{-1}$ of not less than 0.5 m·Pas and not more than 2.4 m·Pas, and a ratio $\eta_0/\eta_1$ of the viscosity $\eta_0$ relative to the viscosity $\eta_1$ of not less than 1.2 and not more than 10, the core portion is formed of a polymer having a degree of swelling in electrolyte solution of not less than a factor of 5 and not more than a factor of 30, the polymer forming the core portion has a glass-transition temperature of not lower than −50° C. and not higher than 150° C., a core-shell ratio of the organic particles, which is an average thickness of the shell portion relative to a volume-average particle diameter (D50) of the organic particles, is 1.5% or more and 40% or less, and the viscosity $\eta_0$ and the viscosity $\eta_1$ are each at a temperature of 25° C.

6. A method of producing a laminate for a non-aqueous secondary battery comprising:

an application step of, with respect to a porous membrane layer-equipped substrate having a porous membrane layer formed on at least one surface of a substrate, applying a composition for a non-aqueous secondary battery adhesive layer onto the porous membrane layer of the porous membrane layer-equipped substrate by an inkjet method;

a drying step of drying the composition for the non-aqueous secondary battery adhesive layer that has been applied onto the porous membrane layer to form an adhesive layer; and an adhering step of adhering the porous membrane layer-equipped substrate and an adhesion target member via the adhesive layer, wherein the substrate is a separator substrate or an electrode substrate, the composition for the non-aqueous secondary battery adhesive layer comprises organic particles, a thixotropic agent, and water, wherein the organic particles have a core-shell structure including a core portion and a shell portion at least partially covering an outer surface of the core portion, the composition for the non-aqueous secondary battery adhesive layer has a viscosity $\eta_0$ at a shear rate of 100 s$^{-1}$ of less than 10 m·Pas, a viscosity $\eta_1$ at a shear rate of 10,000 s$^{-1}$ of not less than 0.5 m·Pas and not more than 2.4 m·Pas, and a ratio $\eta_0/\eta_1$ of the viscosity $\eta_0$ relative to the viscosity $\eta_1$ of not less than 1.2 and not more than 10, the core portion is formed of a polymer having a degree of swelling in electrolyte solution of not less than a factor of 5 and not more than a factor of 30, the polymer forming the core portion has a glass-transition temperature of not lower than −50° C. and not higher than 150° C., and a core-shell ratio of the organic particles, which is an average thickness of the shell portion relative to a volume-average particle diameter (D50) of the organic particles, is 1.5% or more and 40% or less, and the viscosity $\eta_0$ and the viscosity $\eta_1$ are each at a temperature of 25° C.

7. A method of producing a non-aqueous secondary battery in which a laminate for a non-aqueous secondary battery obtained by the method of producing a laminate for a non-aqueous secondary battery according to claim 6 is used.

8. The battery member for a non-aqueous secondary battery according to claim 1, wherein the polymer forming the shell portion includes a (meth)acrylic acid ester monomer unit.

* * * * *